(12) United States Patent  
De Renzis

(10) Patent No.: US 6,394,352 B1
(45) Date of Patent: May 28, 2002

(54) METHOD OF RECONSTRUCTING SUCCESSIVE SCANS OF A BAR CODE

(75) Inventor: Antonio De Renzis, Budrio (IT)

(73) Assignee: Datalogic S.p.A. (IT)

( * ) Notice: Subject to any disclaimer, the term of this patent is extended or adjusted under 35 U.S.C. 154(b) by 0 days.

(21) Appl. No.: 09/316,119

(22) Filed: May 20, 1999

(30) Foreign Application Priority Data

May 20, 1998 (EP) .............................................. 98830306

(51) Int. Cl.[7] .................................................. G06K 7/10
(52) U.S. Cl. .............................. 235/462.12; 235/462.16
(58) Field of Search ....................... 235/462.12, 462.16, 235/462.19, 462.01, 462.25, 454

(56) References Cited

U.S. PATENT DOCUMENTS

| 3,723,710 A | | 3/1973 | Crouse et al. | 235/462.19 |
|---|---|---|---|---|
| 3,761,685 A | | 9/1973 | Alpert et al. | 235/462.19 |
| 3,838,251 A | | 9/1974 | Herrin | 235/462.19 |
| 4,916,297 A | * | 4/1990 | Tukada et al. | 235/462.12 |
| 5,241,164 A | * | 8/1993 | Pavlidis et al. | 235/462.12 |
| 5,387,787 A | | 2/1995 | Waldron et al. | 235/462.12 |
| 5,457,308 A | * | 10/1995 | Spitz et al. | 235/462.12 |
| 5,777,310 A | * | 7/1998 | Liu et al. | 235/462.12 |
| 5,979,768 A | * | 11/1999 | Koenck | 235/470 |

FOREIGN PATENT DOCUMENTS

EP 0 436 072 A2 7/1991

* cited by examiner

Primary Examiner—Karl D. Frech
Assistant Examiner—Jamara Franklin
(74) Attorney, Agent, or Firm—Lerner, David, Littenberg, Krumholz & Mentlik, LLP

(57) ABSTRACT

A method of reconstructing successive scans of bar codes having a plurality of dark elements separated from light elements, comprising the steps of: performing a first scan of the bar code thereby determining the position and the width of the elements in the first scan with respect to an absolute reference position; calculating the position which the elements in the first scan will take with respect to the absolute reference position in a subsequent scan; making a second scan of the bar code thereby determining the position and the width of the elements in the second scan with respect to the absolute reference position; carrying out a correspondence search step for finding at least one reference element for the first scan and one reference element for the second scan, which have substantially the same position with respect to the absolute reference position and substantially the same width; and combining the elements in the first scan with the elements in the second scan, generating a reconstructed scan.

39 Claims, 15 Drawing Sheets

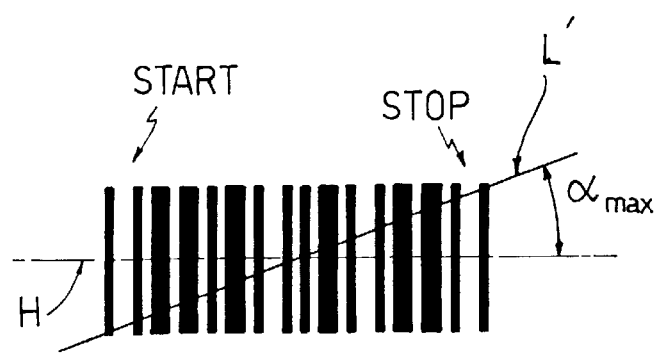
Fig.2
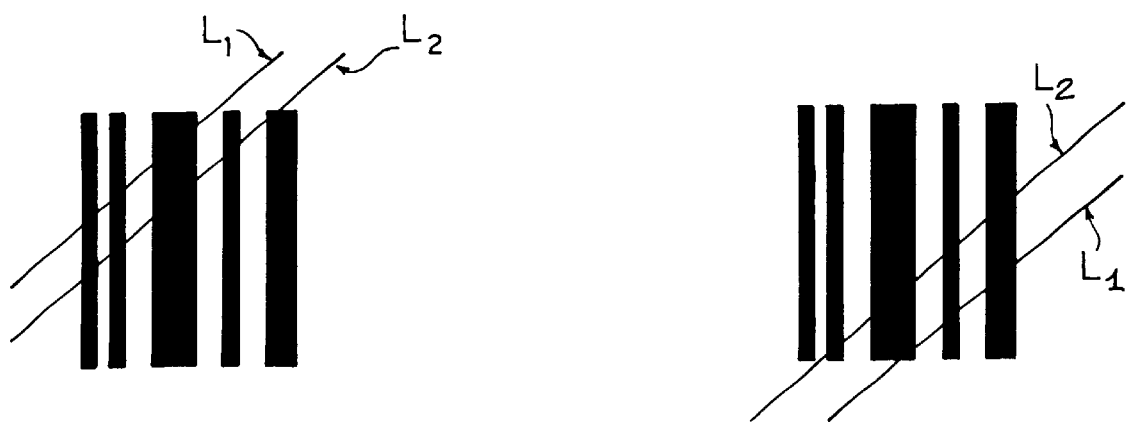
f = 5
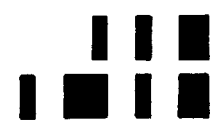
r = 4
Fig.8

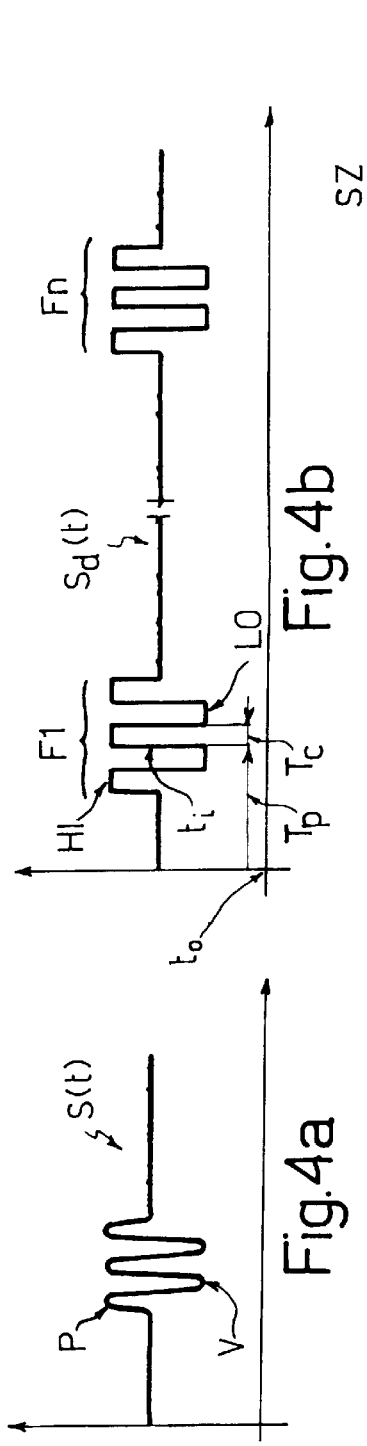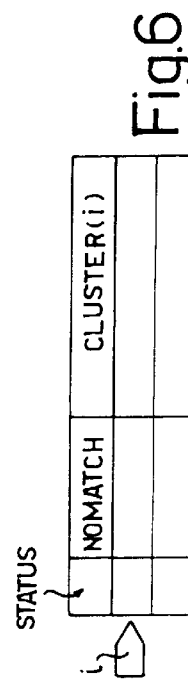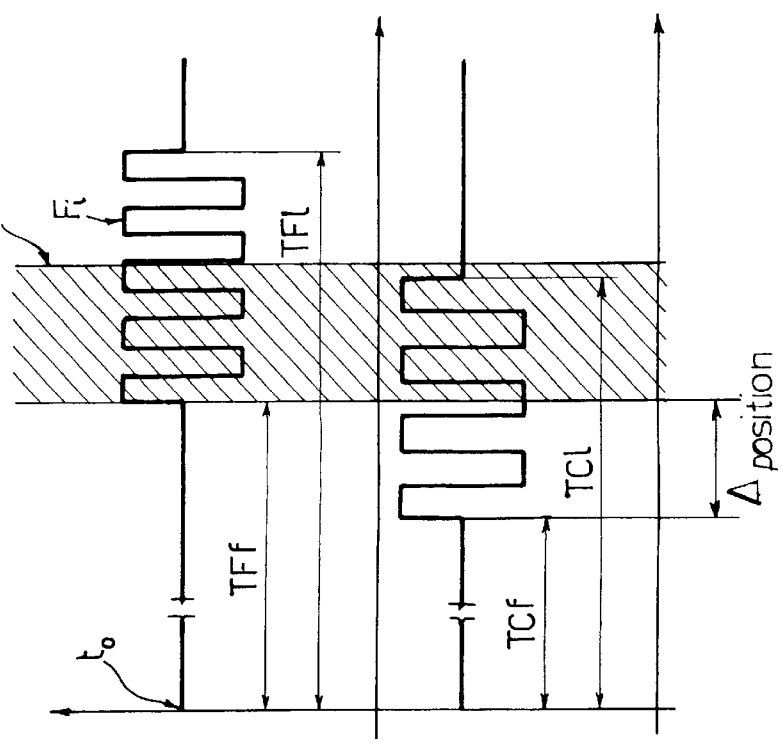

METHOD OF RECONSTRUCTING SUCCESSIVE SCANS OF A BAR CODE

The invention relates to a method of reconstructing successive scans of a bar code.

BACKGROUND OF THE INVENTION

As is known, bar codes (FIG. 2) are optical codes containing coded information made up of a plurality of rectangular elements (bars) having a dark colour (normally black) separated by light elements (spaces, normally white).

Reading devices for the said bar codes usually comprise an illumination device (e.g. a laser beam source) adapted to send an optical reading beam which moves along a scanning path intersecting the bar code and also comprise a sensor (e.g. a photodiode) which receives part of the diffused light from the portion of the scanning path illuminated by the laser spot. The sensor, in response to the radiation falling on it as a result of scanning a bar code, outputs an alternating electric signal having a wave shape which is modulated by the succession of light and dark elements in the bar code. As is known, light is absorbed by the bars and reflected by the spaces, so that the signal generated by a space has a high value owing to the large amount of incident radiation on the sensor, whereas the signal generated by a bar has a low value owing to the small amount of incident radiation on the sensor.

In this manner, a signal generated by scanning the bar code is successively binarised and has a two-level wave shape which represents the elements of the bar code and comprises a first high level when scanning a space and a second low level when scanning a bar.

Normally bar codes are examined in a scanning direction which does not coincide with the longitudinal axis of the code. The scanning direction is therefore usually at an angle to the longitudinal axis of the bar code. More particularly, when this angle exceeds a threshold value $\alpha_{max}$ (FIG. 2), a subset of the code elements are scanned and the binarised signal, which relates to a partial scan of the bar code, comprises a subset of the code elements.

In known devices also, relative movement occurs between the illumination device and the objects bearing the bar codes.

For example the illumination device is fixed and the objects move with respect to the illumination device at a constant speed, when carried by a moving device.

For this reason, successive partial scans normally relate to scanning of various adjacent subgroups in the bar code.

Some known reconstruction devices are adapted to put together successive partial scans of the same code, made in different positions, in order to reconstruct and decode the bar code.

Reconstruction devices of this kind, which put together those elements of a partial scan which have a given inclination with respect to the longitudinal axis of the bar code, effect an omnidirectional readout of the code.

SUMMARY OF THE INVENTION

The object of the invention is to provide a method of reconstructing successive partial scans of a bar code, featuring a particularly efficient omnidirectional reading of the code. Furthermore, object of the invention is to provide a method of reconstructing successive partial scans so as to efficiently manipulate the successive partial scans.

This object is achieved by the invention, which relates to a method of reconstructing successive scans of a bar code comprising a plurality of elements, said elements having a first and a second reflectivity and being represented by a position with respect to a reference position and by a width, characterised by the steps of: performing a first scan of the bar code, determining the position and the width of the elements in the first scan with respect to an absolute reference position; calculating the position which said elements in said first scan will take respect to said absolute reference position in a subsequent scan; making a second scan of the bar code, determining the position and the width of the elements in said second scan with respect to said absolute reference position; carrying out a correspondence search step to find at least one reference element in said first scan and one reference element in said second scan which both have substantially the same position with respect to said absolute reference and substantially the same width; and combining the elements in said first scan with the elements in said second scan so as to generate a reconstructed scan.

More particularly, said correspondence search step is followed by a coupling check step for checking that at least a predetermined number of elements in said first scan and said second scan have substantially the same position with respect to the absolute reference position and substantially the same width.

More particularly, the coupling check step is carried out by comparing at least one minimum defined set of elements in said first scan with a minimum defined set of elements in said second scan.

BRIEF DESCRIPTION OF THE DRAWINGS

The invention will now be described with reference to the accompanying drawings which illustrate a non-limitative embodiment thereof and in which:

FIG. 2 shows a bar code;

FIG. 3b shows a detail of a block in FIG. 3a;

FIGS. 4a and 4b show the time function of an electric signal relating to scanning of a bar code;

FIG. 6 shows a data structure constructed according to the invention;

FIG. 7 shows the time function of signals obtained by the method according to the invention;

FIG. 8 shows a step of the method according to the invention and

DETAILED DESCRIPTION OF THE INVENTION

Figure 1:
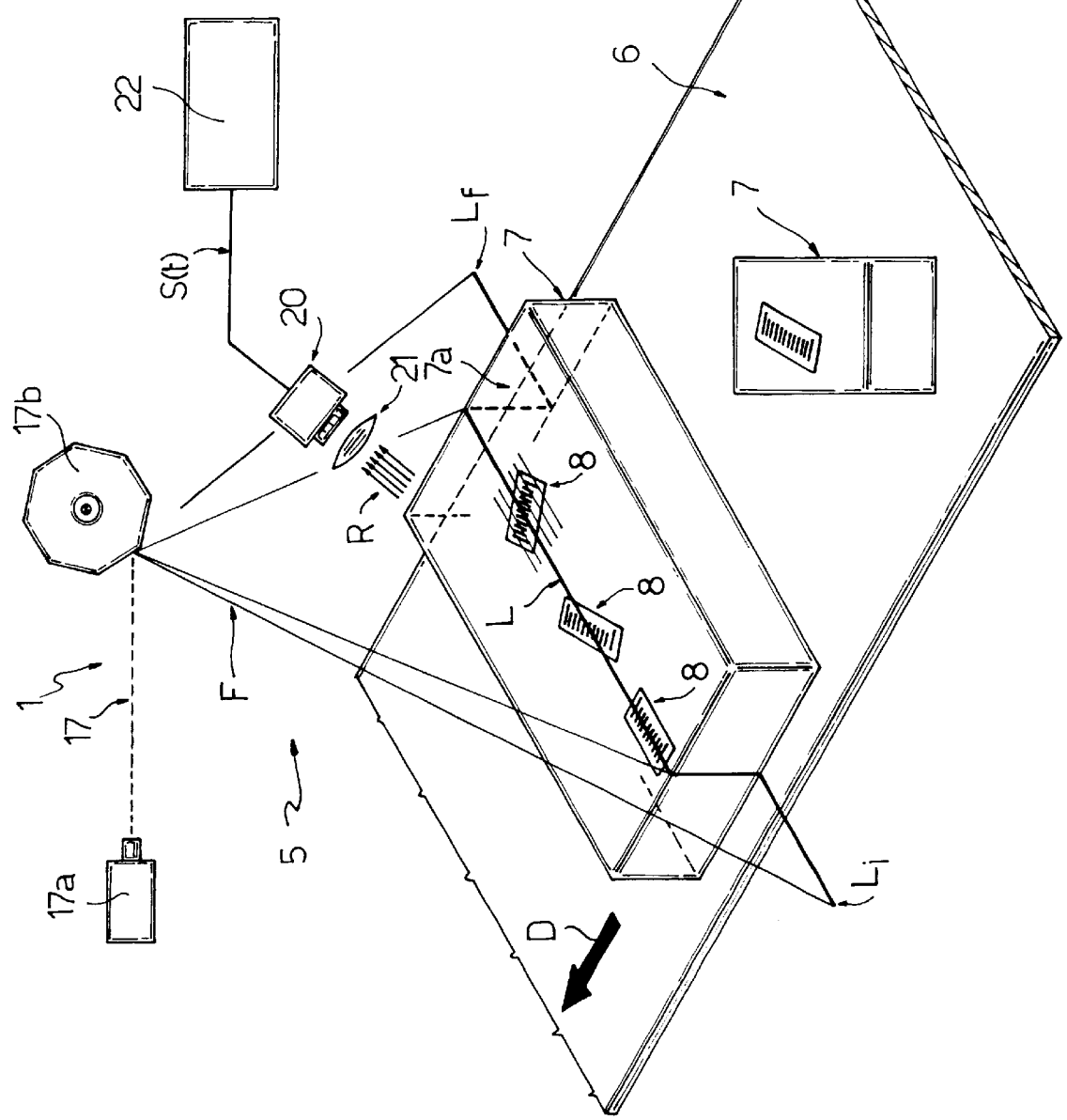
FIG. 1 is a diagram of a device for reading bar codes, using the method according to the invention.

In FIG. 1, reference number 1 indicates as a whole a bar code reading device comprising a reading head 5 facing a conveyor belt 6 and adapted to pick out objects 7 (e.g. packets) disposed on the belt 6 and movable in a rectilinear direction D at a constant speed with respect to the reading head 5. One surface 7a of each object 7 facing the reading head 5 bears one or more optical codes 8, more particularly bar codes of known kind (FIG. 2). Each bar code is made up of a plurality of rectangular portions (bars) having varying reflectivity, more particularly dark (normally black) portions separated by light portions (spaces, normally white). Different dark and light portions (bars and spaces) can have different widths.

The light and dark portions of the code, i.e. the bars and spaces, are the elements of the bar code. In the following description, therefore, a code "element" will mean a bar or a space of the code.

Adjacent elements of the code together form a character of the code, to which coded information is associated.

More particularly the bar code, near a first end portion thereof, has a plurality of elements which together define a code starting character, hereinafter called a START pattern (FIG. 2). Furthermore, the bar code, near a second end portion thereof, has a plurality of elements which together define an end-of-code character, hereinafter called a STOP pattern. The beginning-of-code and end-of-code characters, i.e. the START pattern and the STOP pattern, define the so-called "synchronism characters" of the code.

The reading head 5 comprises a known illumination device 17 (e.g. comprising a laser source 17a and a rotating prismatic mirror 17b adapted to reflect the laser beam produced by the source 17a), for directing a laser scanning beam F on to the optical codes 8 and scanning the codes 8.

More particularly the laser beam F moves in a substantially inclined plane and intersects the belt 6 and the objects thereon along a scanning path L on which the laser spot moves from a beginning-of-scanning position Li to an end-of-scanning position Lf.

The reading head 5 also comprises a sensor 20 (e.g. a photodiode) associated with an optical acquisition and focusing system 21 (diagrammatically represented) for picking up the diffused light radiation R in order to generate an output analog signal S(t) having an intensity proportional to the brightness of the portion of the path L which is being scanned at that moment. The analog signal S(t) is fed to an electronic unit 22 which processes the analog signal S(t) according to the invention. The unit 22 is also adapted to pick up the coded information associated with the code.

Of course, the reading device described with reference to FIG. 1 is one example of the various reading devices which could be used in association with the method according to the invention; the device 1 could be of a different kind and could e.g. comprise a lamp or LEDs for illuminating the bar codes, or a telecamera or a CCD for picking up a grey-level bidimensional image of the bar codes and of the successive processing devices, which likewise output a signal S(t) having an intensity proportional to the brightness of a portion of a scanned bar code.

Figure 3A:
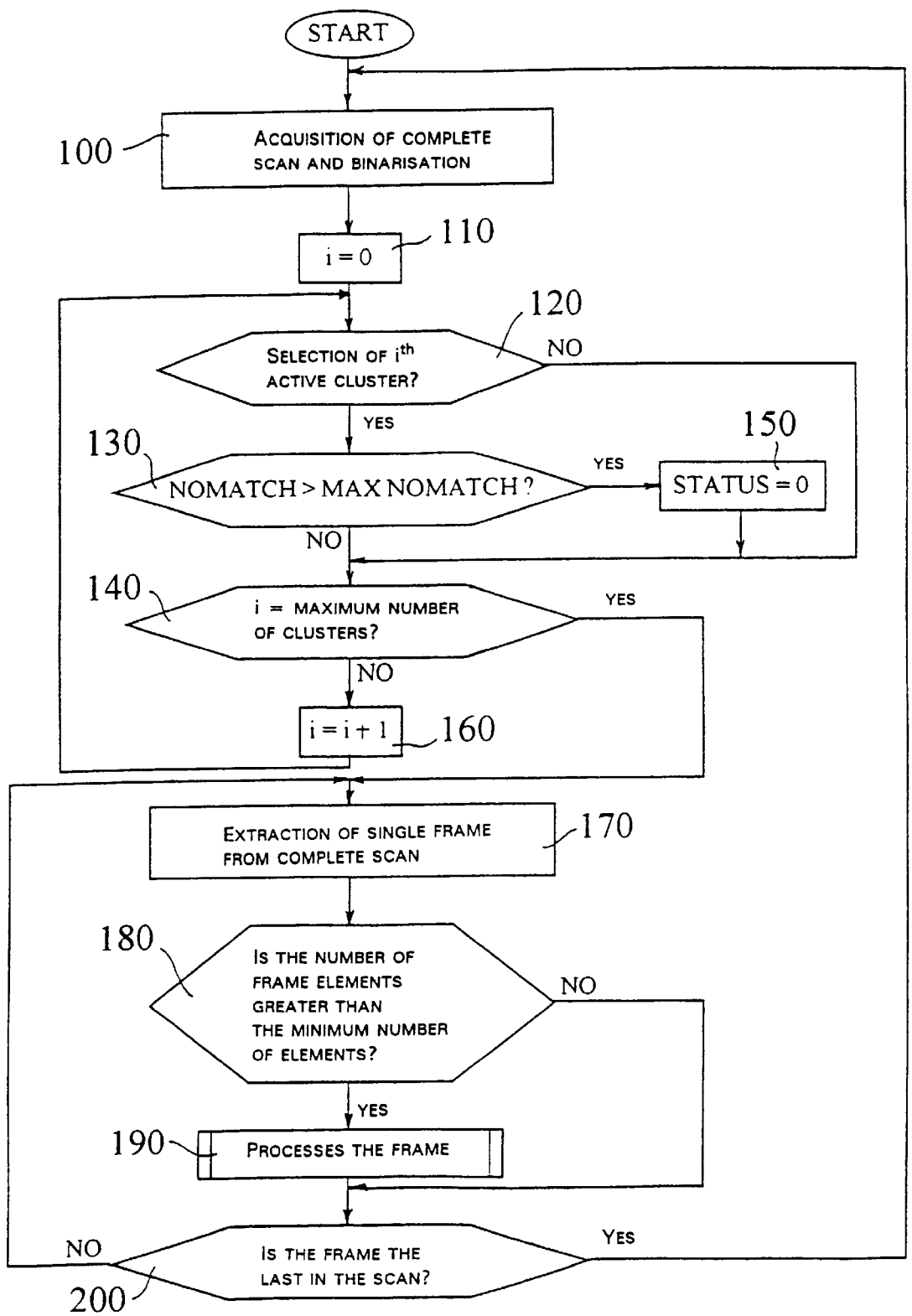
FIG. 3a is a logic block diagram illustrating a sequence of steps of the method according to the invention.

FIG. 3a is a general block diagram of the operating cycle of an electronic processing unit 22.

More particularly FIG. 3a proceeds from a starting block (START) to a block 100 which acquires the analog signal S(t) generated by the sensor 20 after a complete scan of scanning path L. A "complete scan" means a scan in which the laser spot moves from the beginning-of-scanning position Li to the end-of-scanning position Lf.

The analog signal S(t) typically has an initial portion corresponding to scanning the beginning-of-scanning position Li (FIG. 1), a final portion corresponding to scanning the end-of-scanning position Lf and an intermediate section which, corresponding to a scanned bar code, comprises an alternating section (shown in FIG. 4a) formed by a sequence of zones P having a high amplitude (peaks) separated by zones V of low amplitude (valleys).

In the wave form of the alternating section of the signal S(t) a peak P represents a space whereas a valley V represents a bar.

The analog signal S(t) is then binarised in the block 100 and, corresponding to an alternating section thereof, outputs a signal Sd(t) having two levels (shown in FIG. 4b) comprising a first high level HI on scanning a space and a second low level LO on scanning a bar. The high levels HI and low levels LO of the signal Sd(t) are joined by substantially vertical transition fronts which separate the different-level portions of the signal Sd(t) and represent the separation zone between two different elements (bar-space) of the code.

The wave form of the binarised signal Sd(t) is situated on a time axis having its origin (time to) at the instant when scanning begins, i.e. the instant at which the laser spot illuminates the beginning-of-scanning position Li.

The beginning-of-scanning position Li is an absolute spatial reference to which the positions of the bar code elements are referred and consequently the instant to is taken as an absolute time reference with respect to which the positions in time of the code elements represented by the signal Sd(t) are measured.

More particularly the time Tp measured between the time origin to and an instant ti when a digitised signal front Sd(t) is present, represents the time distance between the bar code element following the considered front and the absolute reference (to).

The time interval Tp represents the position of a bar code element with respect to the beginning-of-scanning position.

The time width Tc of the high-level portion HI and/or low-level portion LO of the digitised signal Sd(t) represents the width of a bar code element.

For this reason, each bar code element is represented in the signal Sd(t) by a time interval Tp which represents the position of the bar code element with respect to the absolute reference (time to equivalent to the beginning-of-scanning position Li) and by a time interval Tc which represents the width of the code element.

In the subsequent description, for simplicity, reference will be made to the position of the code element, meaning by this term the time distance Tp thereof, whereas by "width of the code element" the time interval Tc is meant.

In the following description also, the term FRAME will mean a set of code elements as represented by the digitised signal Sd(t).

In other words, each FRAME comprises a plurality of positions and widths representing the elements of the scanned bar code.

A FRAME, for example, can be represented by a table TABF (FIG. 9) in which:
- a first line comprises a number of cells each of which contains the position, with respect to the absolute reference to (time Tp), of an element of the FRAME and therefore represents the position of a bar code element; and
- a second line comprises a plurality of cells each of which contains the width (time Tc) of the corresponding FRAME element and consequently represents the width of a bar code element.

In the following description, the term CLUSTER means a set of FRAMES grouped together by methods described hereinafter. In practice, each CLUSTER represents a storage area in which the FRAMES relating to a given bar code are stored, in the same order as the FRAMES themselves are acquired during successive scans as explained hereinafter.

In similar manner to the FRAMES, the CLUSTER elements are represented e.g. by a table TABC (FIG. 9) in which:

a first row comprises a plurality of cells each of which contains the position, with respect to the absolute reference to (time Tp), of an element of the CLUSTER and therefore represents the position of a bar code element grouped in the CLUSTER; and a second row comprises a plurality of cells each of which contains the width (time Tc) of the corresponding element of the CLUSTER and therefore represents the width of a bar code element grouped in the CLUSTER.

Tables TABC and TABF can be scanned by respective pointers i and j which are able to select pairs of cells (one from the first row and another from the second row) which define a bar code element through its position and its width.

When a number of optical codes or a number of portions of optical codes are illuminated by a single scan, the signal Sd(t) comprises a set of distinct different FRAMES F1, F2, . . . Fn.

A FRAME contains all the elements of a bar code only when the scan occurs along a line between the longitudinal axis H of the code and a line L' (FIG. 2) at an inclination less than or equal to αmax with respect to the axis H.

However, the objects 7 and the optical codes 8 thereon have an arbitrary relative arrangement with respect to the scanning path L. Consequently the scanning line normally intersects only a part of the bar code.

For this reason, each FRAME normally relates to scanning of a subgroup of the bar code elements (not of the entire bar code). Consequently each FRAME relates to a partial scan and represents the cited subgroup of elements.

Figure 5:
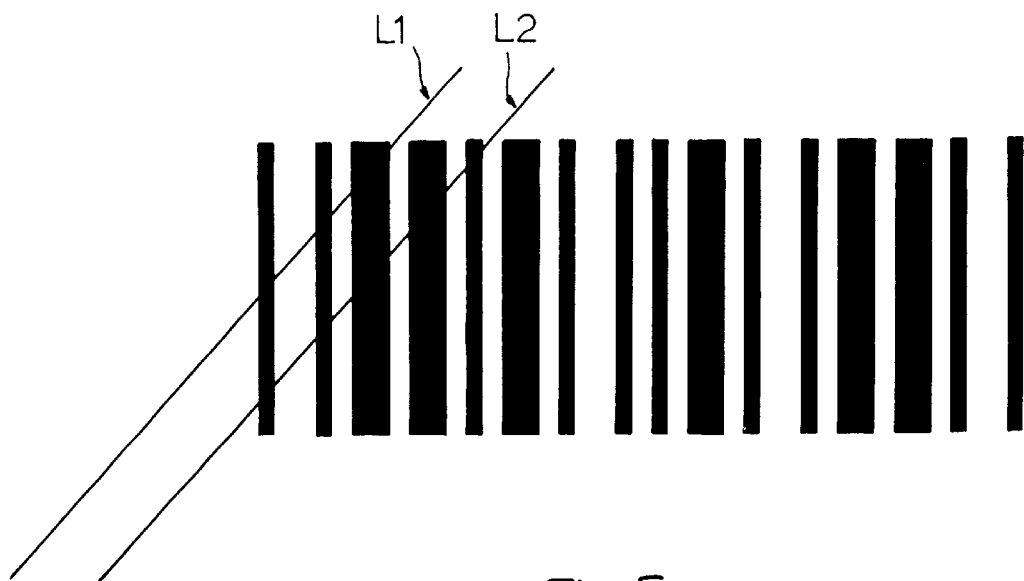
FIG. 5 illustrates scanning of the bar code of FIG. 2.

Furthermore, owing to the motion of the objects 7 with respect to the reading head 5, successive partial scans L1, L2, . . . (FIG. 5) intersect adjacent portions of the code and produce successive FRAMES which relate to different subgroups of elements. Also, the invention relates to a method of reconstructing successive partial scans of bar codes starting from a general signal representing the code elements. It does not matter how the signal was generated or processed.

As will be clearer in the following description, the successive FRAMES relating to scanning of the same code are grouped in a respective CLUSTER which can be individually selected on the basis of the value taken by a pointer i.

Each CLUSTER is also marked by a first index called STATUS, which indicates the state of the CLUSTER; more particularly the index can take three values corresponding to three different situations:

STATUS=0—the associated CLUSTER is empty, i.e. is not associated with any active data structure in which FRAMES can be grouped;

STATUS=1—the associated CLUSTER contains a frame whereby a synchronism character, i.e. a START pattern or a STOP pattern, has been recognised for a first time; and STATUS=2—the CLUSTER contains at least two FRAMES whereby synchronism characters have been recognised.

In the following description, STATUS 1 and STATUS 2 will be called active states, whereas STATUS 0 will be called inactive state. Of course, when the algorithm is activated, the STATUS index of all the CLUSTERS will be zero. Subsequently the STATUS index of the CLUSTERS is modified (transferred to one of the two active states or set at zero) depending on the result of checks made on the CLUSTER itself or on the result of attempts to couple each CLUSTER to the extracted FRAMES as described in detail. Consequently, active CLUSTERS and inactive CLUSTERS will generally be present at every moment.

Each CLUSTER is also marked by a second index called NOMATCH which represents the number of failed attempts made to associate additional FRAMES to the same CLUSTER.

The block 100 is followed by a block 110 for cancelling the contents i of a counter in accordance with the logic operation i=0.

The block 110 is followed by a block 120 which selects the $i^{th}$ CLUSTER and checks the status of the first STATUS index associated with this $i^{th}$ CLUSTER. More particularly the block 120 checks whether the STATUS index of the $i^{th}$ CLUSTER is an active state, i.e.:

CLUSTER(i), STATUS=1; or

CLUSTER(i), STATUS=2

In the case where the check by block 120 gives a positive result (i.e. the $i^{th}$ CLUSTER examined is in the active state), a block 130 is selected; otherwise ($i^{th}$ CLUSTER inactive) the block 120 is followed by a block 140.

The block 130 re-selects the $i^{th}$ CLUSTER and checks the value of the second NOMATCH index; more particularly if the NOMATCH index is equal to or above a threshold value MAX-NOMATCH, i.e. if at least MAX-NOMATCH failed attempts have been made to associate the $i^{th}$ CLUSTER with additional FRAMES, block 130 will select a block 150 for forcing to zero the first STATUS index of the $i^{th}$ CLUSTER which at present is active, i.e.:

CLUSTER(i), STATUS=0

In other words, active CLUSTERS for which at least MAX-NOMATCH failed attempts have been made to associate them with new FRAMES are transferred to the inactive state, i.e. cancelled and made available for storing FRAME elements which cannot be associated with active CLUSTERS.

The block 150 is followed by block 140.

The block 140 is adapted to examine the current value i of the counter. If the value is below the maximum number of CLUSTERS present in the memory (i<MAXIMUM NUMBER OF CLUSTERS) the block 140 is followed by a block 160 which increases by one unit the contents i of the counter, by the logic operation i=i+1, and a return is made from block 160 to block 120.

If block 140 detects that the contents i of the counter is equal to the number of CLUSTERS present in the memory (i=MAXIMUM NUMBER OF CLUSTER) block 140 is followed by block 170.

The preceding operations have the combined result of scanning the set of all the CLUSTERS present in the memory and the following operations are performed for each scanned CLUSTER:

if the CLUSTER is marked by an inactive state index (STATUS=0), the CLUSTER is not modified (i.e. no type of operation is performed); and if the CLUSTER is marked by an active state index (STATUS=1, 2), the number of failed attempts to associate the said CLUSTER with additional frames is checked and, if the threshold value MAX-NOMATCH is exceeded, the CLUSTER is put in the inactive state by forcing to zero the STATUS index.

The block 170 is adapted in known manner to select a single FRAME Fi from the signal Sd(t) relating to a complete scan.

The block 170 is followed by a block 180 adapted to count the number Nf of elements of the FRAME Fi previously selected, i.e. the number of bar code elements represented by the FRAME. If the number Nf is above a minimum number of elements defining a threshold value, the block 180 is followed by a block 190, otherwise the block 180 is followed by a block 200. The block 190 (described in detail hereinafter) selected when the FRAME Fi comprises a number of elements above the minimum number of elements is adapted to process the FRAME, i.e. is adapted to try to associate the FRAME Fi with each active CLUSTER. The block 190 is in any case followed by the block 200, which checks whether the FRAME Fi under examination is the last FRAME contained in the scan detected by the block 100. If not, a return is made from block 200 to block 170 in order to select another FRAME Fi+1, or otherwise (after examination of the FRAMES in the scan) a return is made from block 200 to block 100 in order to acquire another scan. In the other scan, of course, the objects 7 will be in a different position from the preceding scan and consequently different portions of the bar code will be scanned and FRAMES will be detected relating to partial scans of the codes made in different successive positions from the positions in the preceding scan.

Figure 3B:
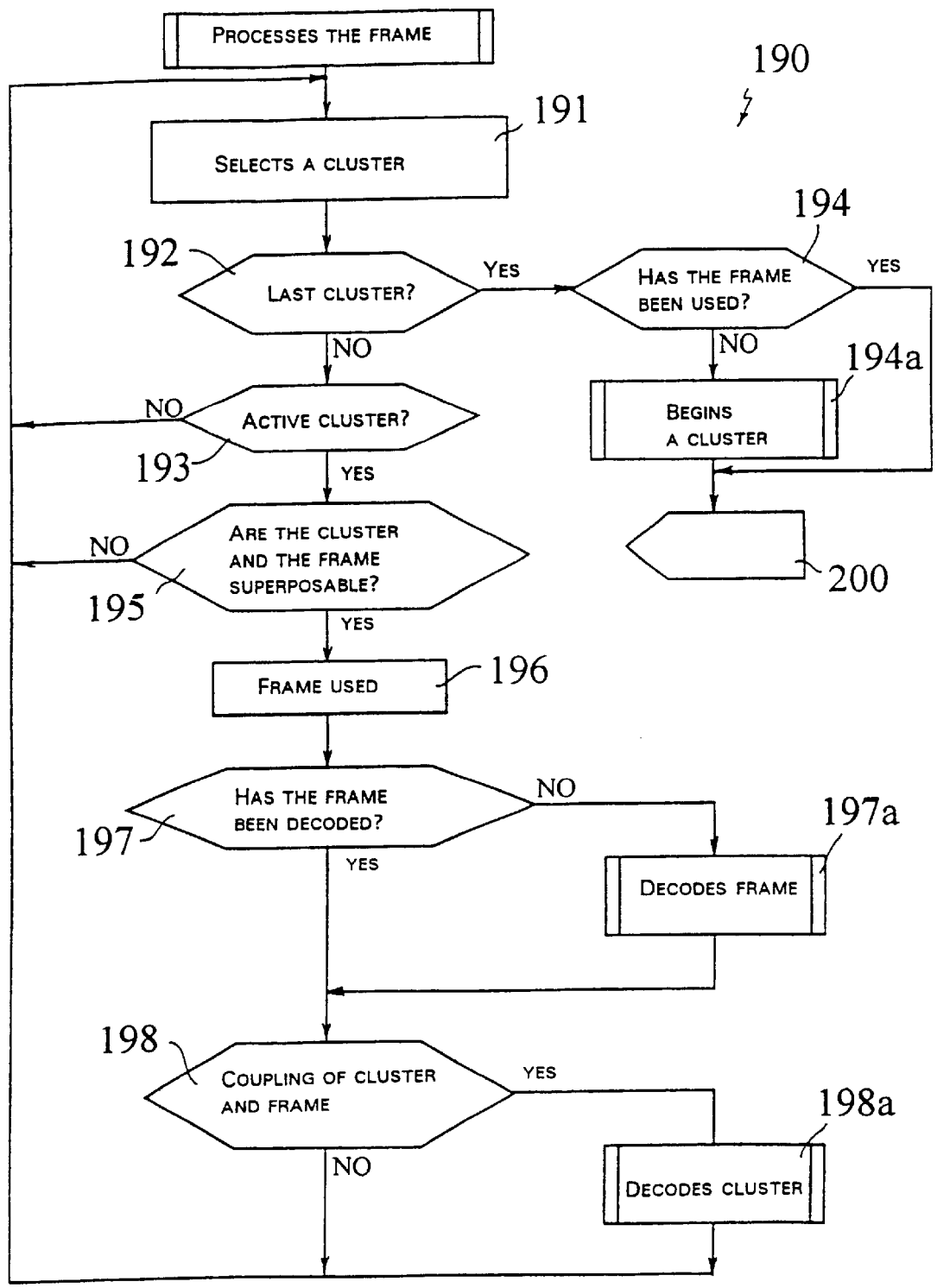

FIG. 3b gives a detailed view of the block 190 adapted to process the FRAME Fi extracted from the block 170. The process consists in attempting to associate the FRAME Fi with all the active CLUSTERS present in the memory.

More particularly the block 190 comprises a block 191 adapted to select a first CLUSTER. The block 191 is followed by a block 192 which checks whether the selected CLUSTER is the last CLUSTER present in the memory. If not so (other CLUSTERS are present in the memory) the block 190 selects a block 193, otherwise (after examination of the CLUSTERS present in the memory) the block 192 selects a block 194.

The block 193 checks whether the selected CLUSTER is an active CLUSTER; if so (the selected CLUSTER is active) the block 193 is followed by a block 195, otherwise (the selected CLUSTER is inactive) a return is made from block 193 to block 191.

The combined results of the previously-described operation is to scan all the CLUSTERS (active and inactive) and select the active CLUSTERS only. In the case of each selected active CLUSTER, an attempt is made to associate the FRAME Fi as described hereinafter.

Initially, the block 195 (described in detail hereinafter) checks whether the FRAME Fi and the selected CLUSTER intersect, i.e. whether the FRAME and the CLUSTER comprise elements which have comparable positions when superposed.

If the check of the block 195 gives a negative result (the FRAME Fi and the CLUSTER do not intersect) a return is made from block 195 to block 191. Otherwise (the FRAME Fi and the CLUSTER intersect and can be combined) the block 195 is followed by a block 196.

The block 196 modifies a state index of the FRAME, by putting it in a state indicating the use made of the FRAME. Indeed this use is made subsequently during the next attempt to combine the FRAME Fi with the various active CLUSTERS.

The block 196 is followed by a block 197 which checks whether the FRAME Fi has already been decoded; if not (no attempt has yet been made to decode the FRAME) the block 197 is followed by a block 197a which attempts this decoding. Otherwise (the FRAME has already been decoded) the block 197 is followed by a block 198. The fact that the FRAME has been successfully decoded in block 197a means that this FRAME comprises all the elements of the bar code; in that case it is of course unnecessary to reconstruct the successive partial scans. The decoded code is therefore transmitted to the exterior of the unit 22.

The block 198 (described in detail hereinafter) tries to combine the FRAME Fi with a first active CLUSTER; if the attempt has a negative result, the contents of a counter measuring the NOMATCH number of failed combination attempts made by the CLUSTER is incremented by one unit and the block 198 is followed by the block 191 for selecting another active CLUSTER and repeating the effort to combine the same FRAME Fi with the additional CLUSTER.

If the combination process in the block 198 has given a positive result, the block 198 is followed by a block 198a which tries to decode the CLUSTER to which the FRAME Fi has been successfully added. If the CLUSTER is successfully decoded, the decoded code is transmitted to the exterior of the unit 22. The block 198a is likewise followed by the block 191.

The block 194 checks the value of the state index of the FRAME Fi indicative of its use. If the index indicates that the FRAME Fi has been subjected to a combination attempt with at least one active CLUSTER, a transition is made from block 194 to block 200 (FIG. 3a) for selecting (block 170) an additional FRAME Fi+1 which will be subjected to the operations in block 190 described with reference to FIG. 3b. If the state index of the FRAME indicates that the FRAME Fi has not yet been subjected to a combination attempt, the block 194 is followed by a block 194a (described in detail hereinafter) which initialises a CLUSTER by inserting the FRAME Fi into it. The block 194a is likewise followed by the block 200.

Figure 3C:
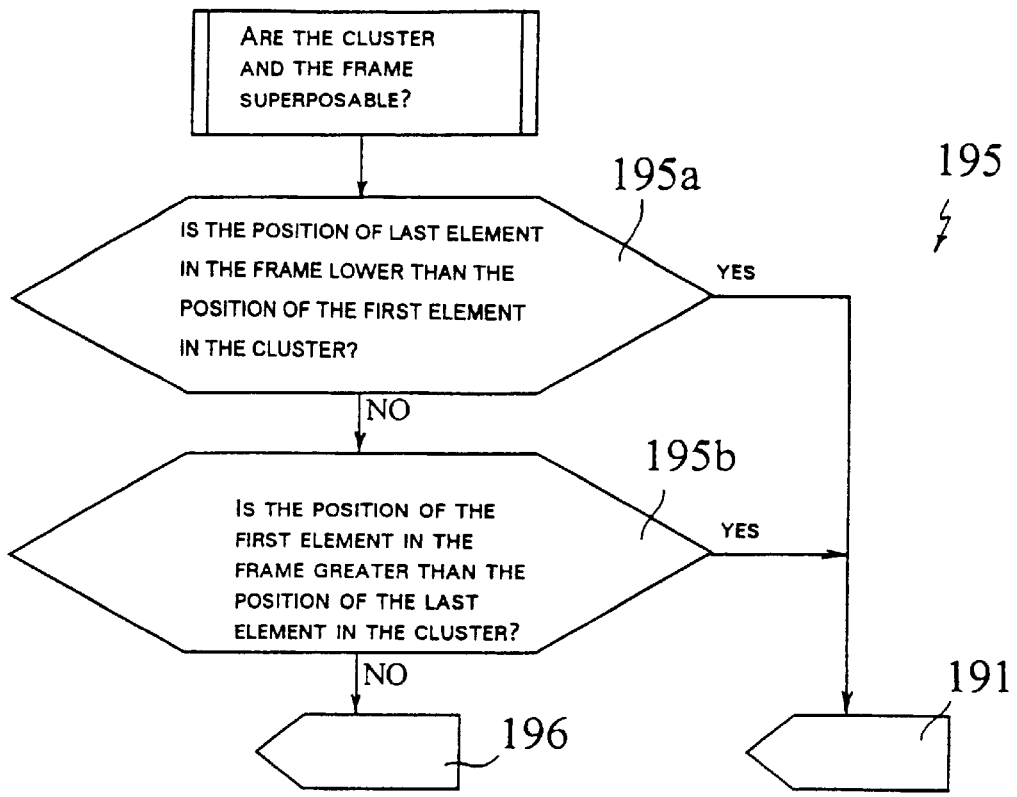
FIG. 3c shows a detail of a block in FIG. 3b.

FIG. 3c shows details of the block 195 which checks whether the FRAME Fi and the selected CLUSTER intersect and are therefore superposable.

The block 195 comprises a first block 195a which checks whether the position Tfl (FIG. 7) of the last element in the FRAME with respect to the absolute reference (the beginning-of-scanning position corresponding to the time to) is lower than the position TCf of the first element of the CLUSTER with respect to the absolute reference, i.e.

Tfl<TCf (1).

If the inequality (1) hereinbefore gives a positive result, the CLUSTER and the FRAME are recognised as non-superposable and a return is made from block 195a to block 191. If the inequality (1) hereinbefore gives a negative result, the block 195a is followed by a block 195b.

The block 195b checks whether the position TFf of the first element in the FRAME with respect to the absolute reference is higher than the position TCl of the last element in the CLUSTER with respect to the absolute reference, i.e.:

TCl<TFf (2).

If the inequality (2) hereinbefore gives a positive result, the CLUSTER and the FRAME are recognised as non-superposable and a return is made from block 195b to block 191. If both the inequalities (1) and (2) hereinbefore give a negative result, the CLUSTER and the FRAME are recognised as superposable and the block 195b is followed by the block 196. FIG. 7 illustrates the case where both inequalities have given a negative result, when as can be seen the CLUSTER and the FRAME have a superposed zone SZ (indicated by shading) containing elements having comparable positions in the CLUSTER and in the FRAME.

Figure 3D:
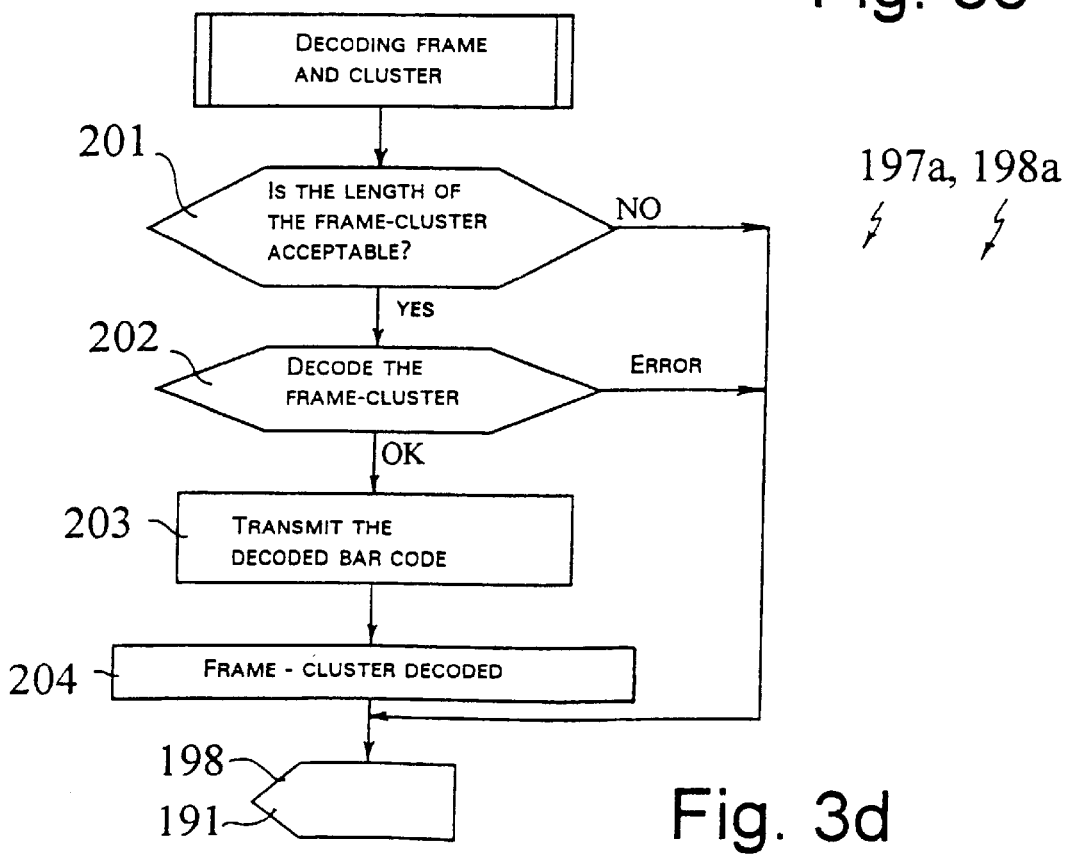
FIG. 3d shows a detail of a block in FIG. 3b.

FIG. 3d illustrates the blocks 197a or 198a, which try to decode the FRAME (or the CLUSTER).

The block 197a, 198a comprises an initial block 201 which checks whether the length of the FRAME (or the CLUSTER) is acceptable for a bar code, i.e. whether it contains a number of elements compatible with a bar code.

If not (the FRAME or CLUSTER has a length incompatible with the length of a bar code) the block 201 is followed by the block 198 (or 191), otherwise the block 201 is followed by a block 202. The block 202 tries to decode the FRAME (or the CLUSTER) in a manner known per se, e.g. as described in U.S. Pat. No. 3,723,710, U.S. Pat. No. 3,761,685 or U.S. Pat. No. 3,838,251. Decoding the frame in block 202 is sufficient in those fortunate cases where the entire code is read from the first scans. In such cases it is impossible to couple the FRAME to the relevant CLUSTER a second time (as explained in detail hereinafter with reference to block 400 in FIG. 3g) and consequently the process does not go via the block 198a (FIG. 3b) for decoding the CLUSTER. If no decoding occurs the block 202 is followed by the block 198 (or 191), or otherwise (the FRAME or CLUSTER is decoded successfully) the block 202 is followed by a block 203. The block 203 transmits the contents of decoding the FRAME (or CLUSTER) to the exterior of the unit 22, thus decoding the bar code. The block 203 is followed by a block 204 which indicates that the FRAME (or CLUSTER) has been decoded. The block 204 is followed by block 198 (or 191). Although the FRAME (or CLUSTER) has been decoded, efforts are still made to associate the FRAME with other CLUSTERS, since the wrong code may have been decoded. Subsequently and in known manner, the true decoding of the code is chosen from among all decodings made.

Figure 3E:
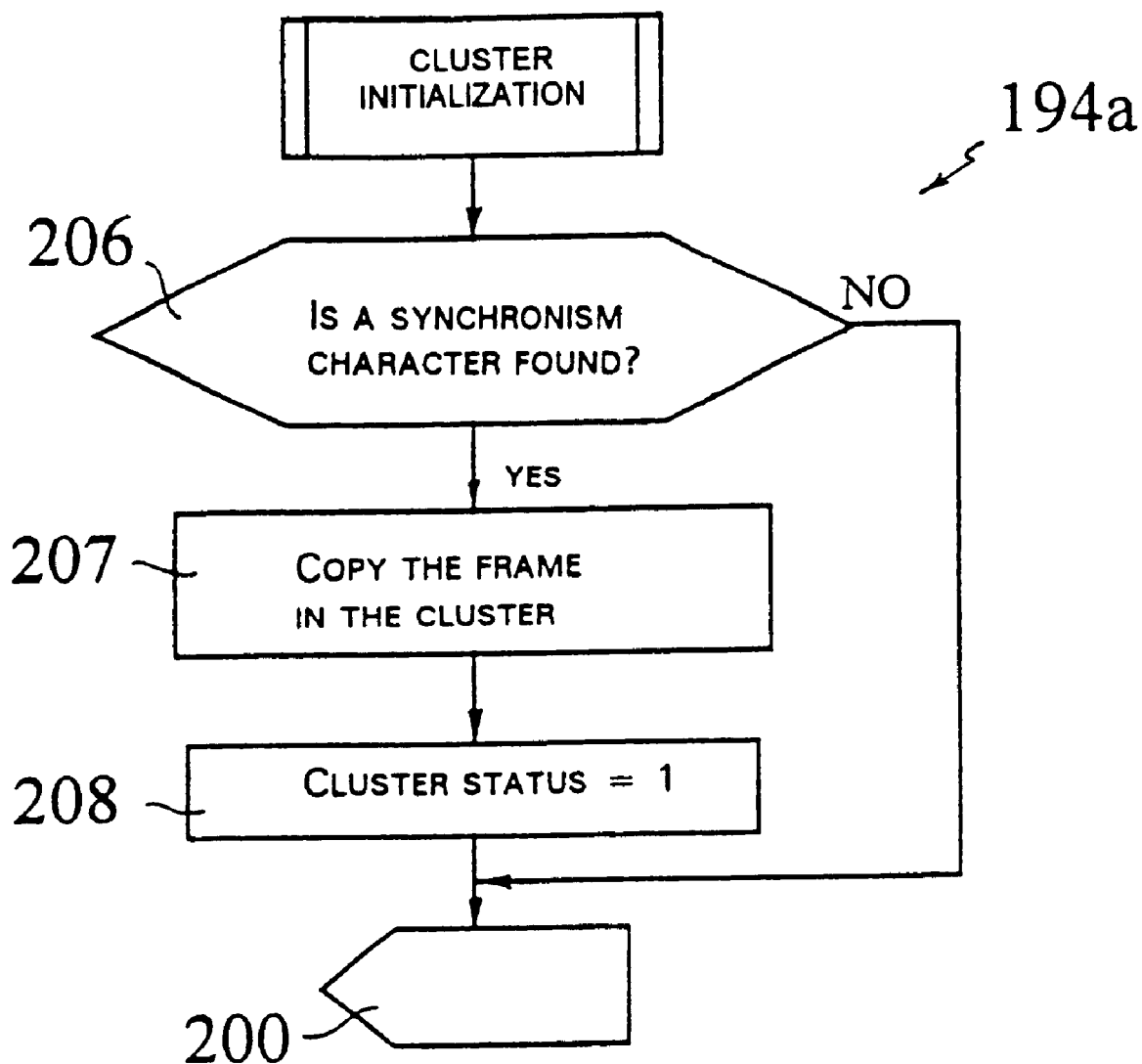
FIG. 3e shows a detail of a block in FIG. 3b.

FIG. 3e illustrates block 194a, which initialises a CLUSTER. Block 194a comprises an initial block 206 for checking whether there is a synchronism character in the FRAME under examination. If the check by block 206 is positive, a transition is made to a block 207, otherwise the block 206 is followed by block 200.

The block 207 copies all the elements of the FRAME inside a CLUSTER by transferring the position and width of all the FRAME elements to the CLUSTER.

The block 207 is followed by a block 208 which sets the state index of the CLUSTER at 1, i.e. STATUS=1 in that the CLUSTER now contains a FRAME containing a synchronism character. The block 208 is followed by the block 200.

In other words, if the FRAME has not been used in any active CLUSTER, an attempt at initialisation is made by copying the FRAME in a new CLUSTER, but only if the FRAME has a synchronism character.

Figure 3F:
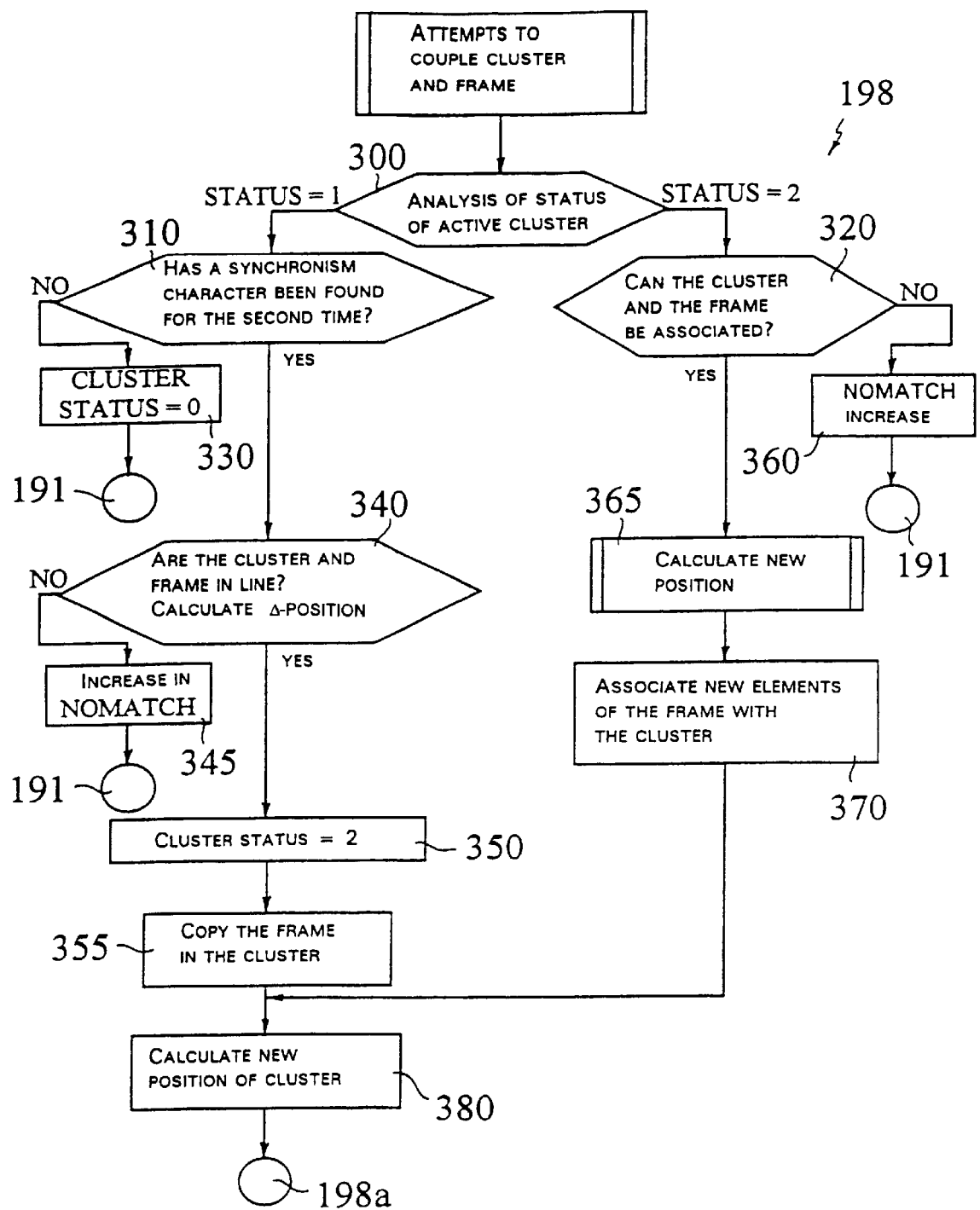
FIG. 3f shows a detail of a block in FIG. 3b.

FIG. 3f gives a detailed view of the block 198 which tries to associate a FRAME Fi with an active CLUSTER.

The block 198 comprises an initial block 300 which controls the state index, variable between 1 and 2, of the CLUSTER. The CLUSTERS examined by block 300 are only active CLUSTERS, i.e. undoubtedly contain at least one FRAME in which a synchronism character is present. The block 300 selects a block 310 if a STATUS of 1 is detected, or a block 320 if a STATUS of 2 is detected.

Basically the block 310 is selected on examination of a CLUSTER which contains a single FRAME in which a synchronism character is present.

The block 310 checks whether the FRAME under examination contains a second synchronism character. If the check is negative, the block 310 is followed by a block 330 which cancels the CLUSTER by setting its state at zero, i.e. the CLUSTER is made inactive and the possible reconstruction is blocked. The block 330 is also followed by the block 191.

In the case of a positive check by the block 310, i.e. if the FRAME contains a second synchronism character, reconstruction begins. Therefore, reconstruction begins only after detection of two successive FRAMES each containing a synchronism character.

To this end the block 310 is followed by a block 340 (described in detail hereinafter) which checks for correspondence between the FRAME and the CLUSTER in order to check whether the FRAME and the CLUSTER belong to the same code.

The block 340 selects a block 345 if the check gives a negative result (FRAME and CLUSTER not aligned) or a block 350 if the check is positive (FRAME and CLUSTER in line), thus setting the STATUS of the CLUSTER at 2. The block 345 increases the counter defining the NOMATCH number by one unit; this block is in fact selected after a failed attempt when searching for correspondence between a FRAME and a CLUSTER. The block 345 is then followed by the block 191.

The block 340 then calculates the distance between the synchronism character of the FRAME and the corresponding synchronism character of the CLUSTER.

Figure 3G:
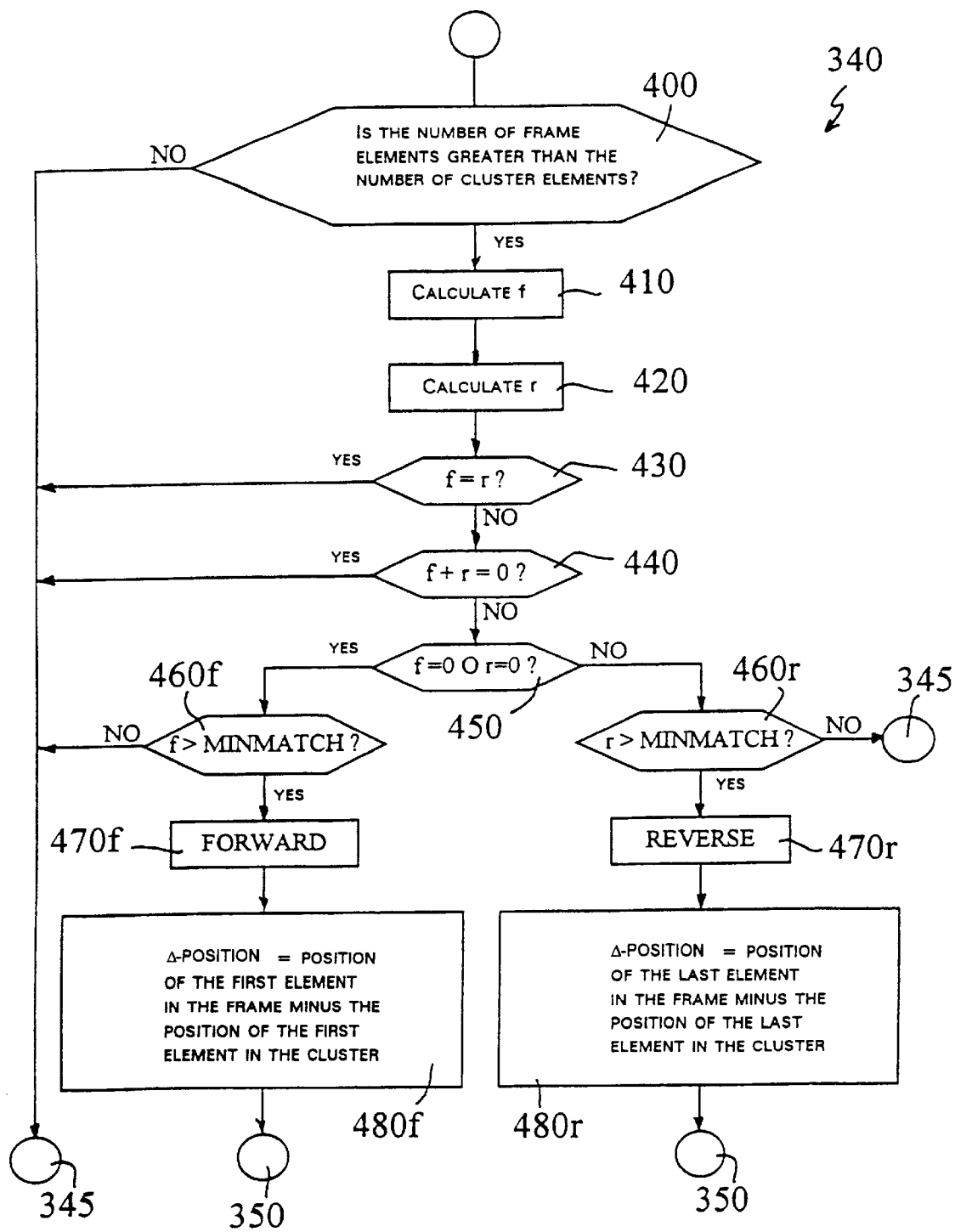
FIG. 3g shows a detail of a block in FIG. 3f.

In this connection reference should be made to FIG. 3g, which illustrates the block 340 which calculates the distance Δ-position after successfully checking for correspondence between the FRAME and the CLUSTER, in order to check whether the FRAME and the CLUSTER relate to scanning of the same code.

The block 340 comprises an initial block 400 which checks whether the number of elements in the FRAME is greater than the number of elements in the CLUSTER. If this is not so, an error situation is detected and the block 400 is followed by block 345 and 191; otherwise the block 400 is followed by block 410. Of course, in the fortunate case in which the entire bar code has already been read in the preceding scan and the present scan also relates to all the elements of the code, the check made in block 400 will prevent coupling between the actual FRAME and the CLUSTER and the situation will be as described hereinbefore with reference to block 197a in FIG. 3b.

The block 410 calculates the number f of code elements which are superposed in the FRAME and in the CLUSTER, i.e. which have the same position with respect to the absolute reference and the same width, by making, the comparison (FIG. 8) starting from the first element of the FRAME and from the first element of the CLUSTER (corresponding to the left or FORWARD).

The block 410 is followed by a block 420 which calculates the number r of elements which are superposed in the FRAME and in the CLUSTER, i.e. which have the same position with respect to the absolute reference and the same width, starting the comparison from the last element of the FRAME and from the last element of the CLUSTER (corresponding to the right or REVERSE).

Referring to FIG. 8, the CLUSTER contains the code elements detected in the scan marked L1, whereas the FRAME contains the code elements found by the scan marked L2.

The block 420 is followed by a block 430 which checks whether the number r is equal to the number f. If the numbers r and f are equal, an uncertainty situation is detected (the number of superposable elements on the right corresponds to the number of superposable elements on the left) and consequently the code is not reconstructed. The block 430 is followed by blocks 345 and 191. If the numbers r and f are different, the block 430 is followed by a block 440 which checks whether the number r or the number f is different from zero. If at least one of the said numbers is equal to zero, a non-correspondence situation is detected and consequently the code is not reconstructed. Blocks 430 and 440 are followed by blocks 345 and 191. If either the number r or the number f are different from zero, a block 450 is selected which checks whether the number f is greater than the number r. If the number f is greater than the number r a block 460*f* is selected, otherwise (f is less than r) a block 460*r* is selected.

The block 460*f* checks whether the number f of superposable elements starting from the left is greater than a threshold value MINMATCH; if f is less than the threshold (i.e. when there are a limited number of elements which are superposed a in the FRAME and in the CLUSTER), an error is detected, reconstruction does not begin and consequently blocks 345 and 191 are selected. If f is greater than the MINMATCH threshold (i.e. if there are a sufficient number of superposed elements in the FRAME and in the CLUSTER) the block 460*f* selects a block 470*f* which stores the superposition condition starting from the left (or FORWARD direction) of the bar code with respect to the reading head. The block 470*f* is followed by a block 480*f* which calculates the value $\Delta$-position as the difference between the position of the first element in the FRAME and the position of the first element in the CLUSTER (see FIG. 7).

Reconstruction of the code therefore begins and the block 480*f* is followed by a block 350 (FIGS. 3*f* and 3*g*) which puts the STATUS index at two (STATUS=2) indicating the beginning of reconstruction. The situation in fact means that two successive superposable FRAMES have been detected and both have a synchronism code; the term $\Delta$-position has also been calculated on the basis of these two first FRAMES.

The block 460*r* checks whether the number r of superposable elements starting from the right is greater than a threshold value MINMATCH. If r is less than the threshold (i.e. if there are a limited number of corresponding elements in the FRAME and in the CLUSTER) an error is detected, reconstruction does not begin and the blocks 345 and 191 are selected. If r is above the MINMATCH threshold (i.e. when there is a sufficient number of superposed elements in the FRAME and in the CLUSTER) the block 460*r* selects a block 470*r* which stores the superposition condition starting from the right (BACKWARDS or REVERSE direction) of the bar code with respect to the reading head. The block 470*r* is followed by a block 480*r* which calculates the value $\Delta$-position as the difference between the position of the last element in the FRAME and the position of the last element in the CLUSTER.

Reconstruction of the code therefore begins and the block 480*r* is also followed by the block 350 which sets the state index at two.

Returning to FIG. 3*f*, the block 350 which, as already stated, sets the first STATUS index of the CLUSTER at 2 indicating the beginning of reconstruction, is followed by a block 355 which associates the FRAME with the CLUSTER by copying the FRAME elements in the CLUSTER.

The block 355 is followed by a block 380 which recalculates the position of the CLUSTER by disposing it in the position provided for the subsequent scan (due to the movement of the conveyor belt 6 (FIG. 1) and based on the measured displacement of the CLUSTER with respect to the just-associated FRAME. The block 380 (described in detail in FIG. 31) applies the $\Delta$-position displacement to all elements of the CLUSTER, i.e. a new position is calculated for each element of the CLUSTER by summing the $\Delta$-position term at the present position. For each element in the CLUSTER, therefore, the block 380 makes the following transformation:

NEW POSITION OF CLUSTER ELEMENT=PRESENT POSITION OF CLUSTER ELEMENT+$\Delta$-position To this end, note that the belt 6 moves at a substantially constant speed (e.g. 3 metres per second) with respect to the reading head; the mirror 17*b* also rotates at high speed, e.g. sufficient for 1000 scans per second. The time between one scan and the next is very short, equal to $^{1}/_{1000}$ of a second in the present case. During this time interval the speed of the belt is practically constant, in that substantial variations in speed would require very high acceleration (of the order of several tens of g) which are obviously unobtainable or unimaginable in the case of a conveyor-belt device.

Consequently the position to be taken by the CLUSTER in order to be comparable with a FRAME detected in a subsequent scan is approximated with high accuracy by the block 380 (FIG. 31), which subjects the relevant elements in the CLUSTER to a final scan after making a displacement ($\Delta$-position) which is estimated on the assumption of a constant velocity between the last scan contained in the CLUSTER and the subsequent scan which will give rise to the next FRAME.

The block 380 is then followed by the block 198*a*.

The block 320 (described in detail hereinafter) reached when reconstruction is begun, STATUS=2, checks whether the FRAME Fi and the CLUSTER analysed by block 300 can be associated. The CLUSTER taking part in the operations of block 320 is a CLUSTER which contains two FRAMES each comprising a synchronism character; the block 320 is normally selected during the third or fourth scan of the bar code.

If the association attempted by block 320 is unsuccessful, block 320 is followed by a block 360 which increases by one unit the counter which defines the number NOMATCH; the block 360 is then followed by the block 191.

If the association attempt by block 320 is successful, the block 320 is followed by a block 365 (described in detail hereinafter) which corrects the calculation of the distance $\Delta$-position between the FRAME and the CLUSTER| previously calculated in block 340 (FIG. 3*g*).

Block 365 is followed by a block 370 (similar to block 355) which, after the operations performed by block 320, associates the new FRAME elements in the CLUSTER. The operations of block 370 will be described in detail hereinafter.

Blocks 355 and 370 are followed by block 380, which in turn is followed by block 198*a*.

Figure 3H:
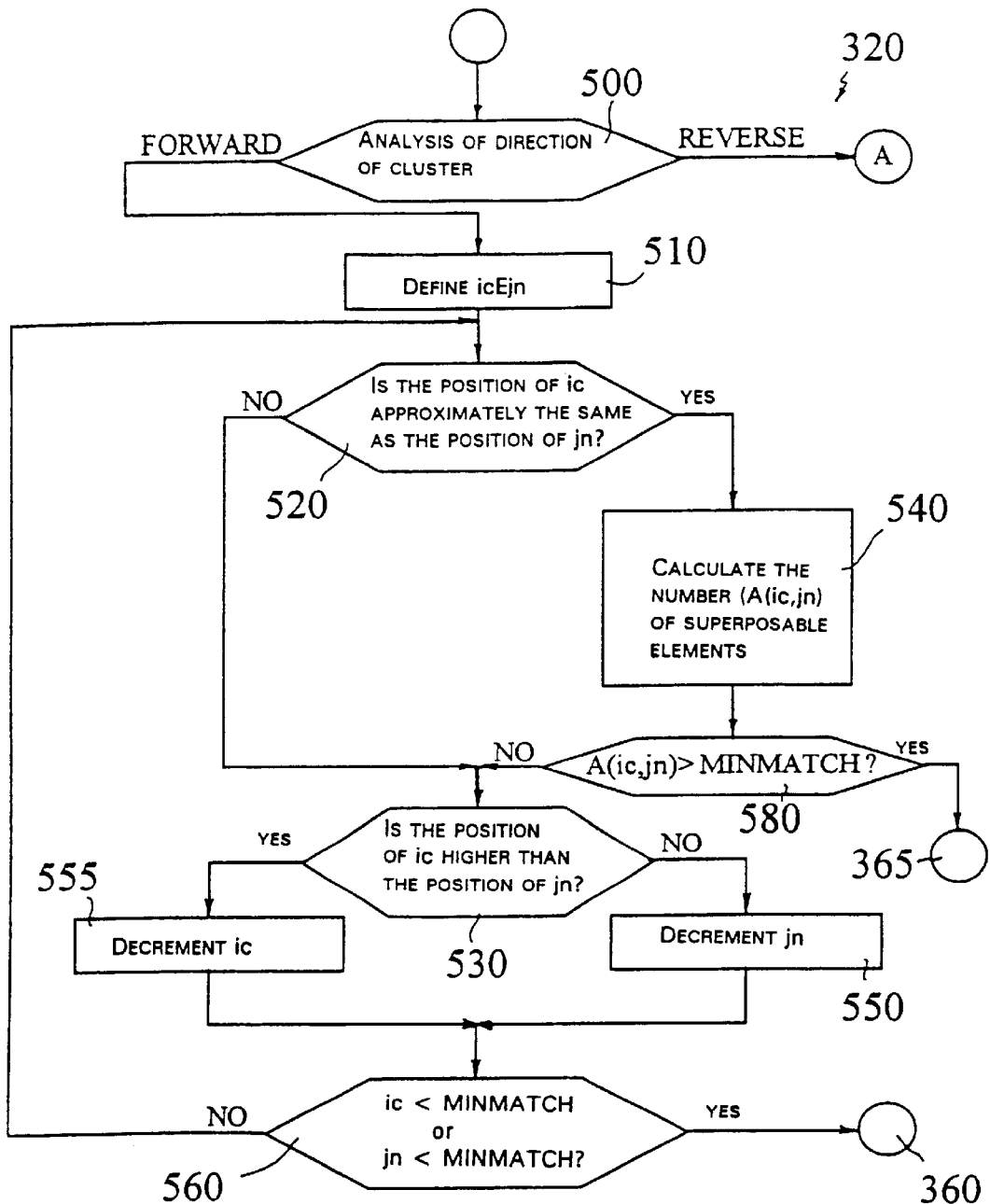
FIGS. 3h and 3i show details of a block in FIG. 3f.
Figure 3I:
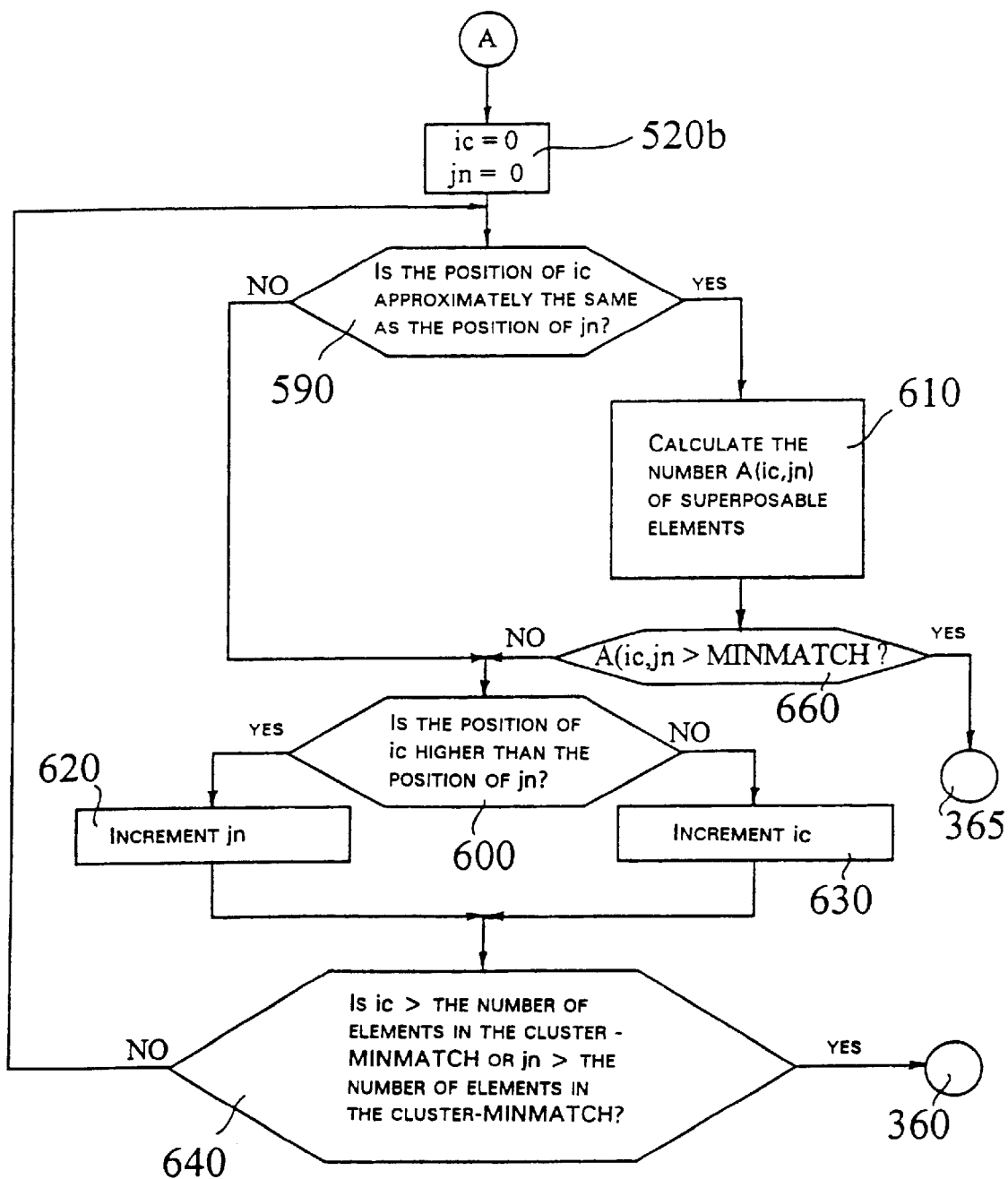

FIGS. 3*h* and 3*i* illustrate details of the block 320, which tries to associate the FRAME Fi with the CLUSTER under examination.

The block 320 comprises an initial block 500 (FIG. 3*h*) which checks whether the bar code has made a FORWARD movement (block 460*f*, FIG. 3*g*) or a REVERSE movement (block 460*r*, FIG. 3*g*) with respect to the reading head. In the first case (FORWARD movement) a block 510 is selected and in the second case (REVERSE movement) a block 520*b* is selected (FIG. 3*i*).

Figure 9:
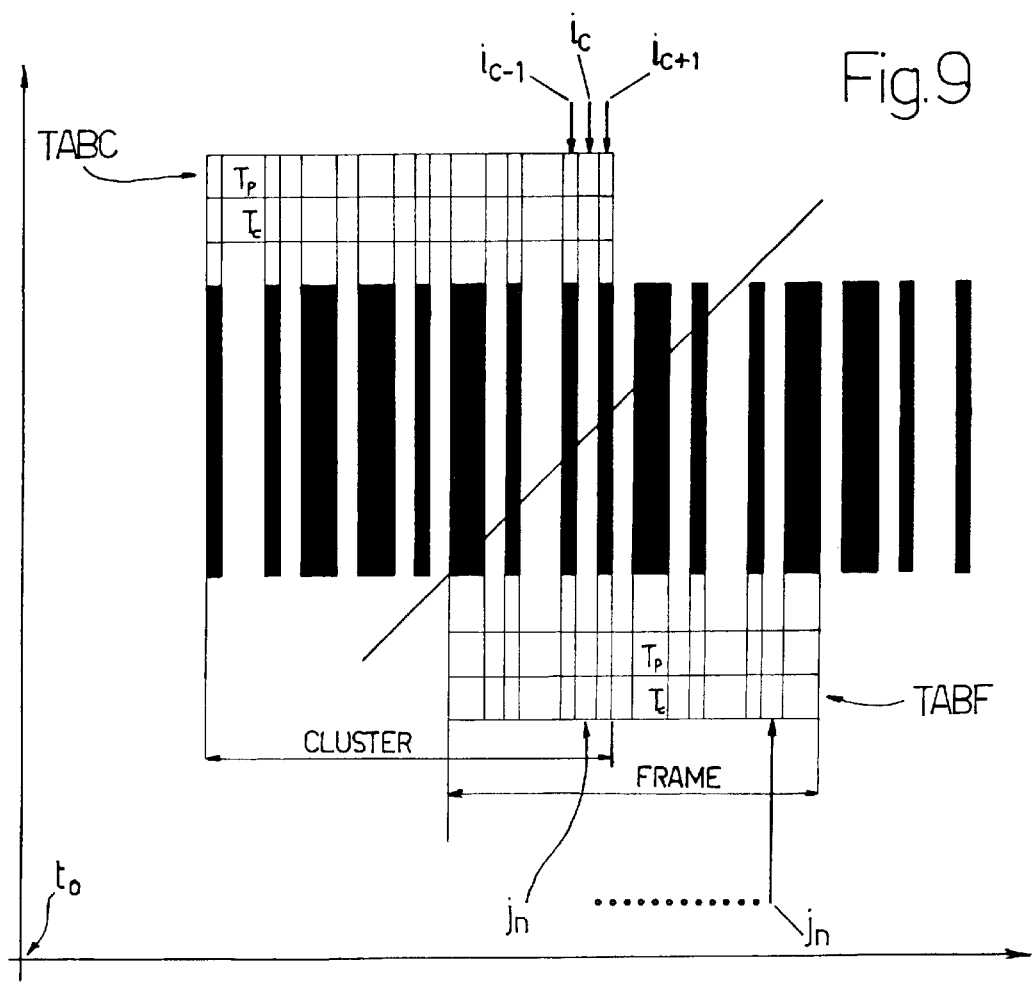
FIG. 9 shows a subsequent step of the method according to the invention.

Block 510 selects the last-but-one element in the CLUSTER, defined by the value ic of a pointer in Table TABC and the last-but-one element of the FRAME, defined by the value jn of a pointer in Table TABF (FIG. 9). In the description hereinafter, for brevity, the term "element ic in the CLUSTER" is used to identify the element in the CLUSTER which is defined by the pointer value ic and "element jn in the FRAME" is used to identify the element of the FRAME which is defined by the pointer value jn.

The block 510 is followed by a block 520 which checks whether the position of element ic of the CLUSTER with respect to the absolute reference is approximately equal to the position of the element jn of the FRAME with respect to the same absolute reference.

In the negative case (the positions of ic and jn do not coincide) the block 520 is followed by the block 530. Otherwise (the positions of ic and jn substantially coincide) the block 520 is followed by a block 540.

The block 530 checks whether the position of element ic in the CLUSTER is higher than the position of element jn in the FRAME.

If so (the position of element ic in the CLUSTER is higher than the position of the element jn in the FRAME) a block 555 is selected; otherwise a block 550 is selected. FIG. 9 illustrates the case regarding selection of the block 550 when the position of element jn of the FRAME is higher than the position of element ic of the CLUSTER.

The block 550 decrements by one unit the value of jn, i.e. performs the operation jn=jn−1, in order to select a FRAME element having a lower position than the preceding one. Correspondingly, the block 555 decrements by unity the value of ic, i.e. performs the operation ic−1, in order to select a CLUSTER element having a lower position than the preceding one.

Blocks 555 and 550 are both followed by a block 560 which checks whether the values ic and jn (previously modified by the respective blocks 555 and 550) are now below a threshold value MINMATCH, i.e.:

ic<MINMATCH or jn<MINMATCH

If at least one of the inequalities hereinbefore is satisfied, block 560 is followed by block 360 (FIGS. 3h and 3f) which detects an error situation and increases the number NOMATCH which describes the number of failed attempts at coupling between CLUSTERS and FRAMES.

If neither inequality of block 560 is satisfied, a return is made from block 560 to block 320, which re-checks the position of the elements ic of the CLUSTER and jn of the FRAME; the check is made by a different element of the CLUSTER or FRAME from the element used in the preceding check step.

The block 540 is selected when the elements ic and jn of the CLUSTER and of the FRAME have substantially the same position. In the example in FIG. 9 this happens when the pointer jn moves from the position from the right to the position on the left at which jn corresponds to an element (a space in the illustrated example) in the FRAME having the same position with respect to the absolute reference as the element (space) in the CLUSTER marked by ic.

Block 540 performs the following operations:

select a plurality of CLUSTER elements starting from the element marked ic in the REVERSE direction towards elements (ic−1, ic−2, . . . ic−n) preceding the said element ic. "Preceding elements" with respect to a given element mean elements having a lower position than the given element.

select a plurality of FRAME elements starting from the element marked jn in the REVERSE direction towards elements (jn−1, jn−2, . . . jn−m) preceding the considered element; and calculate the number A(ic, jn) of superposable elements by comparing at least MINMATCH selected elements in the CLUSTER and in the FRAME, starting from ic and jn. "Superposable elements" means a continuous sequence of elements of the FRAME and of the CLUSTER in which each element of the FRAME of the sequence corresponds to a respective element of the CLUSTER having the same position and the same width.

Block 540 is followed by a block 580 which checks whether the number A(ic, jn) is greater than the number MINMATCH, i.e.:

A(ic, jn)>MINMATCH

If so (A(ic, jn)>MINMATCH) the block 580 is followed by blocks 365 and 370 (FIG. 3f), otherwise (A(ic, jn)<MINMATCH) block 580 is followed by block 530 for a new attempt to check superposability starting from a FRAME element ic or a CLUSTER element jn adjoining the element last considered, since the check for identity of position made in block 520 is only approximate and the calculation and check of the number of superposable elements (based on blocks 540 and 580) may have been made on bar code elements which are distant by only one position.

If so, i.e. if the check shows that the FRAME and CLUSTER can be successfully coupled, a move is made (FIG. 3f) to block 365 (which recalculates the value Δ-position) and to block 370 (FIG. 3f) which copies the FRAME elements following jn in the CLUSTER starting from the element ic. The operations illustrated with reference to FIG. 3i are similar to those illustrated in FIG. 3h, but in this case the operations relate to the REVERSE direction of motion whereas the operations illustrated with reference to FIG. 3h are for the FORWARD direction of advance. Block 520b (FIG. 3i) sets the values of ic and jn at zero, i.e. ic=jn=0.

Block 520b is followed by a block 590 which checks whether the position of the CLUSTER element ic detected with respect to the absolute reference is approximately the same as the position of the FRAME element jn detected with respect to the absolute reference.

If not (i.e. if the positions of the elements associated with ic and jn do not coincide) block 590 is followed by block 600, otherwise (the position of the elements associated with ic and jn substantially coincide) block 590 is followed by a block 610.

Block 600 checks whether the position of element ic in the CLUSTER is higher than the position of the FRAME element jn. If so (position of CLUSTER element ic>position of FRAME element jn), a block 620 is selected, otherwise, a block 630 is selected.

The block 620 increases the value of jn by one unit, i.e. performs the operation jn=in+1, in order to select a FRAME element having a higher position than the preceding one. Similarly block 630 increases the value of ic by one unit, i.e. performs the operation ic=ic+1, in order to select a CLUSTER element having a higher position than the preceding one.

Blocks 620 and 630 are both followed by a block 640 which checks whether the values of ic and jn (previously modified by the blocks 630 and 620 respectively) are now greater than the number of elements in the CLUSTER minus a threshold value MINMATCH, i.e.:

ic>number of elements in the CLUSTER—MINMATCH or jn>number of elements in the CLUSTER—MINMATCH If at least one of the inequalities hereinbefore is satisfied, block 640 is followed by block 360 (FIGS. 3i and 3f) which detects an error situation and increases the NOMATCH number, which describes the number of failed attempts at coupling CLUSTER and FRAME.

If none of the inequalities is satisfied in block 640, block 640 is followed by block 590 which re-checks the position of the elements associated with ic and jn. The check is made on a different CLUSTER element or FRAME element from that used in the preceding check step.

The block 610 is selected when the elements associated with ic and jn have substantially the same position and performs the following operations:

it selects a plurality of CLUSTER elements starting from the element marked ic and in the FORWARD direction towards elements (ic+1, ic+2, . . . ic+n) which follow the last element ic. "Elements which follow a given element" mean elements having a higher position than the given element.

it selects a plurality of FRAME elements starting from the element marked jn and in the FORWARD direction towards elements (jn+1, jn+2, . . . jn+m) following the last element jn and it calculates the number A(ic, jn) of superposable elements by comparing at least MINMATCH selected elements of the CLUSTER and the FRAME.

Block 610 is followed by a block 660 which checks whether the number A(ic, jn) is greater than the number MINMATCH, i.e.:

A(ic, jn)>MINMATCH

If so, (A(ic, jn)>MINMATCH), the block 660 is followed by blocks 365 and 370; if not (A(ic, jn)<MINMATCH), block 660 is followed by block 600.

In the positive case, i.e. where the FRAME and CLUSTER can be successfully coupled, a move is made to block 365 (FIG. 3f) which recalculates the value Δ-position and to the block 370 and the FRAME elements preceding jn are copied in the CLUSTER, starting from the element ic.

Element ic is therefore a reference element with respect to which the CLUSTER and the FRAME are aligned. Block 370 also carries out a "junction" step between the FRAME and the CLUSTER in which all the FRAME elements disposed on a given side with respect to the reference element are copied in the CLUSTER. More particularly in the FORWARD case (FIG. 3h) from the reference element (i.e. towards elements having a higher position) the FRAME elements are selected and copied in the CLUSTER, whereas in the BACKWARD direction from the reference point (i.e. towards elements having a lower position) the CLUSTER elements are retained.

The operations performed by block 320 define a correspondence search step in which a selection is made (blocks 510 and 520a) of an element (denoted by the pointer value ic, ic−1, ic+1) for beginning a check of the CLUSTER; a selection is made (blocks 510 and 520a) of a check start element (denoted by, pointer value jn) of the FRAME and a corresponding check step is carried out (blocks 520 and 590) to check whether the position of the check start element in the CLUSTER with respect to the absolute reference is approximately the same as the position of the check start element of the FRAME with respect to the absolute reference.

If the correspondence check step gives a negative result, an iterative modification step is carried out (by blocks 530, 555, 559, 560; 600, 620, 630, 640) in order to select subsequent CLUSTER or FRAME elements adjoining the check start element. The iterative modification step is carried out by other CLUSTER or FRAME elements until the correspondence check step arrives at a positive result (output to blocks 540 and 610). In such cases, a possible coupling between FRAME and CLUSTER is initially detected. Initially the coupling is detected in the case of a single element of the FRAME or the CLUSTER. In order however to recognise the coupling with greater reliability, a series of further operations are performed in the method according to the invention, including the following:

selecting (blocks 540, 610) a plurality of CLUSTER elements starting from the reference element which satisfies the correspondence check step in a predetermined direction (i.e. in the REVERSE or the FORWARD direction), starting from the reference element towards elements remote from the reference element;

selecting (blocks 540, 610) a plurality of FRAME elements starting from the reference element (jn) which satisfies the correspondence check step and in a predetermined direction (the said REVERSE and FORWARD directions) starting from the reference element towards elements remote from the reference element;

calculating (blocks 540, 610) the number of superposable elements among those selected in the CLUSTER and in the FRAME and detecting (blocks 580 and 660) that the correspondence search step has given a positive result when the number of superposable elements has a predetermined relation to (more particularly is greater than) the reference MINMATCH.

In this manner, coupling between FRAME and CLUSTER is recognised with greater reliability in that FRAME elements and CLUSTER elements are compared together.

Note that the correspondence search operations start from the last-but-one element of the FRAME or the CLUSTER. The last FRAME or CLUSTER element is not selected, since it may provide information which is insufficiently reliable, e.g. because of noise.

The last-but-one element is chosen because (see FIG. 8, scan L2) the last element may be only partly crossed by the scanning line, with the result that its width is uncertain.

In this way, the reliability of the correspondence search algorithm is improved.

Figure 3J:
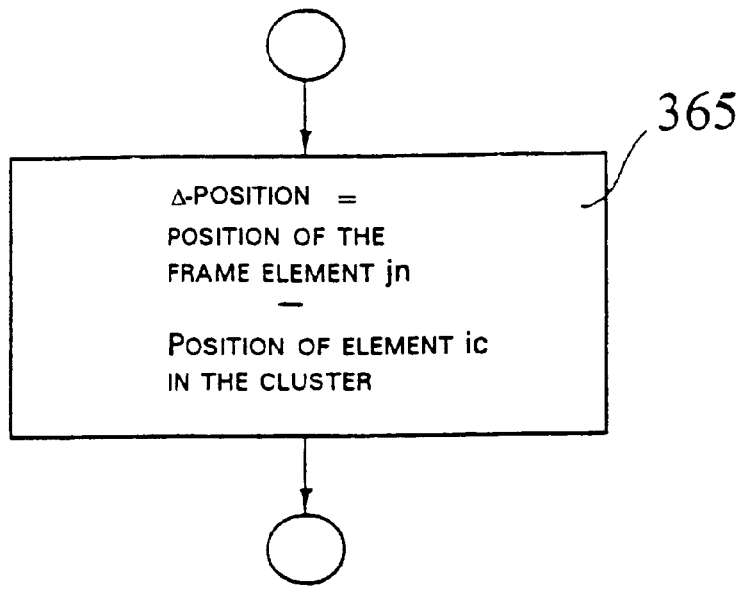
FIG. 3j shows a detail of a block in FIG. 3f.
Figure 3L:
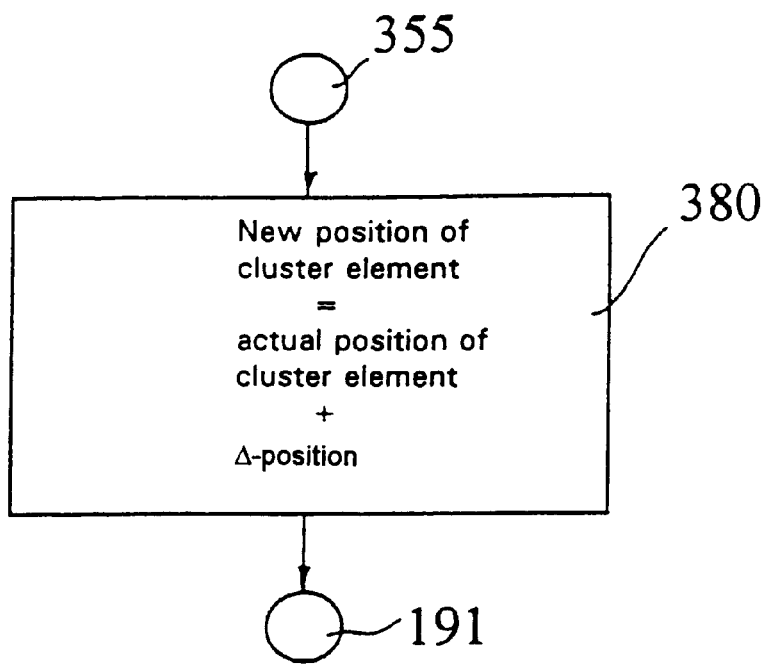
FIG. 3l shows a detail of a block in FIG. 3f.

FIG. 3j shows the block 365, which recalculates the distance Δ-position between the FRAME and the CLUSTER. The distance Δ-position is calculated for the first time by block 340. More particularly, the block 365 recalculates the distance Δ-position as the difference between the position of FRAME element jn and CLUSTER element ic.

As can be seen, therefore, the term Δ-position is initially calculated a first time in block 340 at the beginning of the coupling operations and is successively refined by calculation in block 365.

Figure 3M:
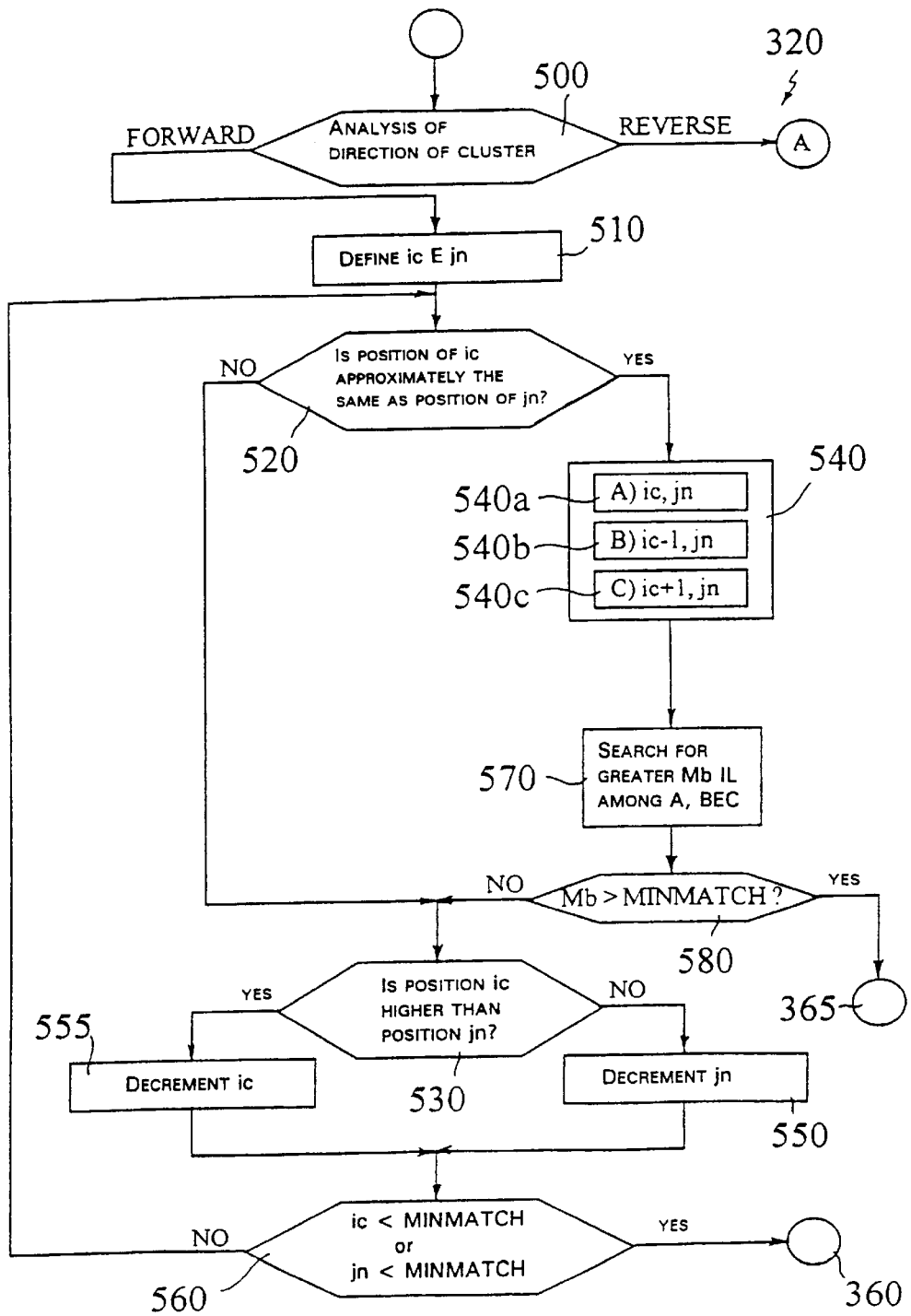
FIGS. 3m and 3n show a different embodiment with respect to FIGS. 3h and 3i.

FIG. 3m illustrates a variant of that described with reference to FIG. 3h. For simplicity, only the parts differing from those previously illustrated will be described.

In the variant shown, block 540 comprises a block 540a which performs the following operations:

it selects a plurality of CLUSTER elements starting from the element denoted by ic in the backward (REVERSE) direction towards elements (ic−1, ic−2, . . . ic−n) preceding element ic. "Elements preceding a given element" means elements having a lower position than this element.

is selects a plurality of FRAME elements starting from the element denoted by jn in the backward (REVERSE) direction towards element (jn−1, jn−2, . . . jn−m) preceding this element and it calculates the number A(ic, jn) of superposable elements by comparing at least MINMATCH selected elements of the CLUSTER and of the FRAME starting from ic and jn. "Superposable elements" means a continuous sequence of elements of the FRAME and of the CLUSTER in which each FRAME element of the sequence corresponds to a respective CLUSTER element having the same position and the same width.

The block 540a is followed by block 540b, which performs the following operations:

it selects a plurality of CLUSTER elements starting from the element denoted by ic−1 in the backward (REVERSE) direction towards elements (ic−2, ic−3, . . . ic−n) preceding element ic−1;

it selects a plurality of FRAME elements starting from the element denoted by jn in the backward (REVERSE) direction towards elements (jn−1, jn−2, . . . jn−m) preceding this element and it calculates the number B(ic−1, jn) of superposable elements by comparing at least MINMATCH selected elements of the CLUSTER and of the FRAME.

The block 540b is followed by the block 540c which performs the following operations:

it selects a plurality of CLUSTER elements starting from the element denoted by ic+1 in the backward (REVERSE) direction towards elements (ic, ic−1, . . . ic−n) preceding element ic+1;

it selects a plurality of FRAME elements starting from the element denoted by jn in the backward (REVERSE) direction towards elements (jn−1, jn−2, . . . jn−m) preceding this element and it calculates the number C(ic+1, jn) of superposable elements by comparing at least MINMATCH selected elements of the CLUSTER and of the FRAME.

The block 540c (the last step in block 540) is followed by a block 570 which searches for the largest number Mb among the numbers A(ic, jn), B(ic−1, jn), C(ic+1, jn) which have previously been calculated in blocks 540a, 540b and 540c.

The block 570 is followed by a block 580 which checks whether the previously-extracted number Mb is greater than a threshold value MINMATCH; if the check made by block 580 has given a negative result (Mb<MINMATCH) a return is made to block 520; if not (Mb>MINMATCH) a move is made from block 580 to block 365.

If it is found that the FRAME and CLUSTER have been successfully coupled, therefore, block 365 (recalculating the value Δ-position) and block 370 are selected (FIG. 3f), block 370 copying the FRAME elements following jn in the CLUSTER starting from the element ic, ic+1 or ic−1 depending on whether the selected greatest number is A(ic, jn), B(ic−1, jn) or C(ic+1, jn).

Figure 3N:
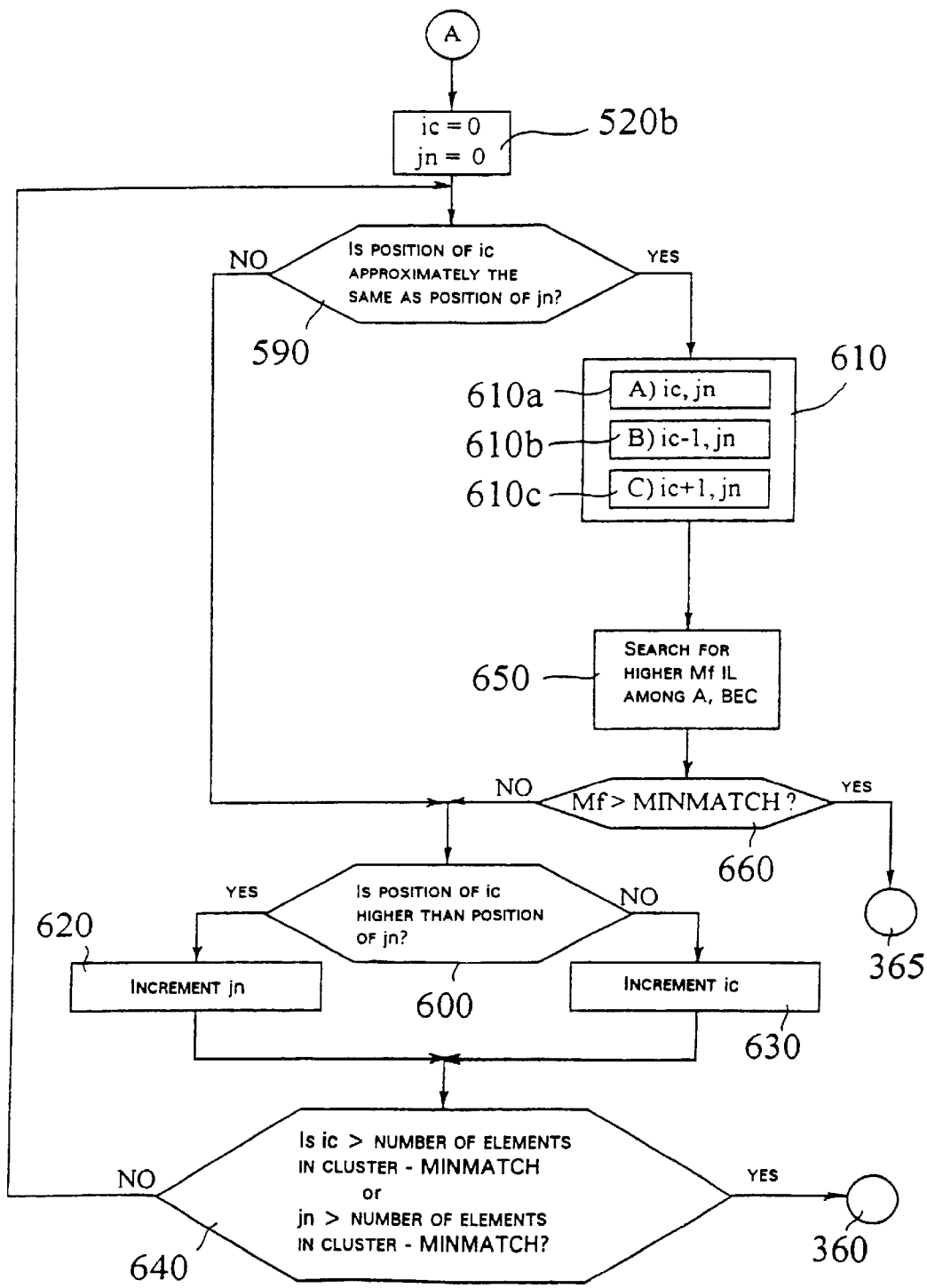

FIG. 3n shows a variant of that described with reference to FIG. 3i. For simplicity, only parts differing from those previously illustrated will be described.

In the variant shown, block 610 comprises a block 610a which performs the following operations:

it selects a plurality of CLUSTER elements starting from the element denoted by ic in the FORWARD direction towards elements (ic+1, ic+2, . . . ic+n) following the last element ic. "Elements following a given element" means elements having a higher position than the given element.

it selects a plurality of FRAME elements starting from the element denoted by jn in the FORWARD direction towards elements (jn+1, jn+2, . . . jn+m) following the last element jn; and it calculates the number A(ic, jn) of superposable elements by comparing at least MINMATCH selected elements of the CLUSTER and of the FRAME.

The block 610a is followed by block 610b which performs the following operations:

it selects a plurality of CLUSTER elements starting from the element denoted by ic−1 in the FORWARD direction towards elements (ic, ic+1, . . . ic+n) following element ic−1;

it selects a plurality of FRAME elements starting from the element denoted by jn in the FORWARD direction towards elements (jn+1, jn+2, . . . jn+m) following element jn and it calculates the number B(ic−1, jn) of superposable elements by comparing at least MINMATCH selected elements of the CLUSTER and of the FRAME.

The block 610b is followed by block 610c which performs the following operations:

it selects a plurality of CLUSTER elements starting from the element denoted by ic+1 in the FORWARD direction towards elements (ic+2, ic+3, . . . ic+n) following element ic+1;

it selects a plurality of FRAME elements starting from the element denoted by jn in the FORWARD direction towards elements (jn+1, jn+2, . . . jn+m) following element jn and calculates the number C(ic+1, jn) of superposable elements by comparing at least MINMATCH selected elements of the CLUSTER and of the FRAME.

The block 610 is followed by a block 650 which searches for the largest number Mf from among the numbers A(ic, jn), B(ic−1, jn), C(ic+1, jn) previously calculated by the blocks 610a, 610b and 610c.

Block 650 is followed by a block 660 which checks whether the number Mf extracted by the previous block 650 is greater than the number MINMATCH, i.e.:

Mf>MINMATCH

If so (Mf>MINMATCH), block 660 is followed by blocks 365 and 370; if not (Mf<MINMATCH) block 660 is followed by block 600.

In the positive case, i.e. where the FRAME and CLUSTER have been successfully coupled, a move is made to block 365 (FIG. 3f) which recalculates the value Δ-position and to block 370, which copies the FRAME elements preceding jn in the CLUSTER starting from element ic, ic+1 or ic−1 depending on whether the selected largest number was A(ic, jn), B(ic−1, jn) or C(ic+1, jn).

Obviously, numerous modifications and variants can be made to the method described and illustrated here, all coming within the scope of the invention as defined in the accompanying claims. In particular it is stressed that the present method, instead of being of the continuous kind and continually scanning and processing the code even after transmission of the decoded code (as described with reference to FIG. 3d, blocks 203, 204), can comprise interruption of the algorithm, setting the CLUSTER to zero and reactivation starting from block 100 only after manual actuation or after recognition of a subsequent code (e.g. after a period of scans without FRAMES). In such cases however it is advisable to insert a check that the number of elements in the FRAME or CLUSTER is equal to a given number of elements, so as to ensure that the code has actually been completely read.

Also the algorithm can be modified by inserting some checks. In particular, each CLUSTER can be associated with an additional indicator (a zero scan counter) which is incremented after any scan which does not result in updating of the CLUSTER. In such cases the reading of the zero scan counter is checked after every scan (e.g. at the initial block 100), if the reading exceeds a given threshold value, the STATUS index of the CLUSTER is set at zero, thus making the CLUSTER available. This operation, however, is not strictly necessary since scans are rarely without elements, owing to the noise which exists even in the intervals between one bar code and the next. The noise however enables CLUSTERS to be opened and subsequently closed by setting the STATUS index of the CLUSTERS at zero, thus making them available for subsequent scans of effective code elements.

What is claimed is:

1. A method of reconstructing successive scans of a bar code comprising a plurality of elements, said elements having a first and a second reflectivity and being represented by a width and a position with respect to a reference position, comprising:

a) performing a first scan of the bar code and determining the position and the width of the elements in the first scan with respect to an absolute reference position which is independent from the barcode;

b) calculating the position which said elements in said first scan will take with respect to said absolute reference position in a subsequent scan;

c) making a second scan of the bar code and determining the position and the width of the elements in said second scan with respect to said absolute reference position;

d) carrying out a correspondence search step in order to find at least one reference element in said first scan and at least one reference element in said second scan which both have substantially the same position with respect to said absolute reference and substantially the same width; and e) combining the elements in said first scan with the elements in said second scan so as to generate a reconstructed scan.

2. A method of reconstructing successive scans of a bar code comprising a plurality of elements, said elements having a first and a second reflectivity and being represented by a width and a position with respect to a reference position, comprising:

a) performing a first scan of the bar code and determining the position and the width of the elements in the first scan with respect to an absolute reference position;

b) calculating the position which said elements in said first scan will take with respect to said absolute reference position in a subsequent scan;

c) making a second scan of the bar code and determining the position and the width of the elements in said second scan with respect to said absolute reference position;

d) carrying out a first correspondence search step in order to find at least one reference element in said first scan and at least one reference element in said second scan which both have substantially the same position with respect to said absolute reference and substantially the same width;

e) combining the elements in said first scan with the elements in said second scan so as to generate a reconstructed scan;

f) calculating the position which said elements in said reconstructed scan will take with respect to said absolute reference position in a subsequent scan;

g) performing a third scan of the bar code and determining the position and the width of the elements in said third scan with respect to said absolute reference position;

h) carrying out a second correspondence search step to find at least one reference element in said reconstructed scan and at least one reference element in said third scan which both have substantially the same position with respect to said absolute reference position and substantially the same width; and i) updating the elements in the reconstructed scan by combining them with the elements in said third scan.

3. A method according to claim 2, further comprising:

j) calculating the position which the elements in the reconstructed scan, after updating in step i) will take with respect to said absolute reference position in a subsequent scan and iteratively repeating said steps g), h) i) and j) until said subsequent scan comprises at least a predetermined number of elements.

4. A method according to claim 3, wherein only said step g) is iteratively repeated as long as said subsequent scan comprises a number of elements less than the predetermined number.

5. A method according to claim 2, further comprising:

j) calculating the position which the elements in the reconstructed scan, after updating in step i)will take with respect to said absolute reference position in a subsequent scan;

attempting to decode said reconstructed scan; and iteratively repeating the steps g), h) i) and j) as long as said step of attempting to decode gives a negative result.

6. A method of reconstructing successive scans of a bar code comprising a plurality of elements, said elements having a first and a second reflectivity and being represented by a width and a position with respect to a reference position, comprising:

a) performing a first scan of the bar code and determining the position and the width of the elements in the first scan with respect to an absolute reference position;

b) calculating the position which said elements in said first scan will take with respect to said absolute reference position in a subsequent scan, c) making a second scan of the bar code and determining the position and the width of the elements in said second scan with respect to said absolute reference position;

d) carrying out a correspondence search step in order to find at least one reference element in said first scan and at least one reference element in said second scan which both have substantially the same position with respect to said absolute reference and substantially the same width; and e) combining the elements in said first scan with the elements in said second scan so as to generate a reconstructed scan, wherein said correspondence search step d) is followed by a coupling check step f) for checking that at least a predetermined number of elements in said first scan and said second scan has substantially the same position with respect to the absolute reference position and substantially the same width.

7. A method according to claim 6, wherein said coupling check step f) is carried out by comparing at least a defined minimum set of elements in said first scan with a minimum defined set of elements in said second scan.

8. A method according to claim 6, wherein in said coupling check step f) a calculation is made of the number of superposable elements in said first and said second scan.

9. A method according to claim 8, wherein said superposable elements are defined by a continuous sequence of elements in said first scan and said second scan having substantially the same position with respect to the absolute reference position and substantially the same width.

10. A method according to claim 6, wherein said step
e) of combining the elements in said first scan with the elements in said second scan is carried out when said coupling check step
f) has given a positive result.

11. A method according to claim 6, wherein said step
e) of combining the elements in the first scan with the elements in the second scan comprises the steps of:
   e1) selecting a first side of said reference element in said first scan comprising said elements in said first scan having substantially the same position and the same width as the elements in the second scan;
   e2) maintaining those elements in the first scan which are disposed on said first side; and
   e3) adding to said first scan those elements in said second scan which are disposed on the side opposite said first side in order to generate said reconstructed scan.

12. A method of reconstructing successive scans of a bar code comprising a plurality of elements, said elements having a first and a second reflectivity and being represented by a width and a position with respect to a reference position, comprising:
   a) performing a first scan of the bar code and determining the position and the width of the elements in the first scan with respect to an absolute reference position;
   b) calculating the position which said elements in said first scan will take with respect to said absolute reference position in a subsequent scan;
   c) making a second scan of the bar code and determining the position and the width of the elements in said second scan with respect to said absolute reference position;
   d) carrying out a correspondence search step in order to find at least one reference element in said first scan and at least one reference element in said second scan which both have substantially the same position with respect to said absolute reference and substantially the same width, said correspondence search step comprising the steps of:
      d1) selecting a check start element among the elements in said first scan and a check start element among the elements in said second scan;
      d2) carrying out a correspondence check step in order to check whether the position of the check start element in the second scan with respect to the absolute reference position is approximately the same as the position of the check start element in the first scan with respect to the absolute reference position; and
         if said correspondence check step d2) has given a negative result, carrying out an iterative modification step 3) to select subsequent elements in the second scan or in the first scan adjacent to said check start element the iterative modification step d3) being carried out with subsequent elements until said correspondence check step d2) arrives at a positive result and said reference element is found; and
   e) combining the elements in said first scan with the elements in said second scan so as to generate a reconstructed scan.

13. A method according to claim 12, wherein said check start element comprises a last-but-one element in the first and in the second scan.

14. A method of reconstructing successive scans of a bar code comprising a plurality of elements, said elements having a first and a second reflectivity and being represented by a width and a position with respect to a reference position, comprising:
   a) performing a first scan of the bar code and determining the position and the width of the elements in the first scan with respect to an absolute reference position;
   b) calculating the position which said elements in said first scan will take with respect to said absolute reference position in a subsequent scan;
   c) making a second scan of the bar code and determining the position and the width of the elements in said second scan with respect to said absolute reference position;
   d) carrying out a correspondence search step in order to find at least one reference element in said first scan and at least one reference element in said second scan which both have substantially the same position with respect to said absolute reference and substantially the same width; and
   e) combining the elements in said first scan with the elements in said second scan so as to generate a reconstructed scan; wherein said correspondence search step d) is followed by a matching step g) for selecting a plurality of elements in said first scan and a plurality of elements in said second scan having better reciprocal superposability, said selected plurality of elements of the first scan and of the second scan being used in said step e) to generate said reconstructed scan.

15. A method according to claim 14, wherein said matching step g) comprises at least the steps of:
   g1) selecting a first plurality of elements in the first scan starting from the reference element in the first scan and a second plurality of elements in the second scan starting from the reference element in the second scan;
   g2) calculating a first quantity as an indication of superposition of elements in the first plurality and of elements in the second plurality;
   g3) selecting a third plurality of elements in the first scan starting from a first element in the first scan nearest the reference element in the first scan;
   g4) calculating a second quantity indicating superposition of said elements in the second and in the third plurality;
   g5) comparing the first and second quantities and selecting said first and second plurality if said first quantity indicates better superposability than said second quantity; and
   g6) comparing said first and second quantity and selecting said second and said third plurality if said second quantity indicates better superposability than said first quantity.

16. A method according to claim 15, wherein said matching step g) comprises the steps of:
   g7) selecting a fourth plurality of elements in the first scan starting from a second element in the first scan nearest the reference element in the first scan;
   g8) calculating a third quantity indicating superposition of said elements in the second and in the fourth plurality and
   g9) comparing said first, second and third quantity and selecting said second and fourth plurality if said third quantity indicates better superposability than said first and second quantity.

17. A method according to claim 16, wherein said first and second element in said first scan are adjacent said reference element in said first scan on two different sides thereof.

18. A method according to claim 15, wherein said quantities comprise the number of elements in said first and said second scan which have substantially the same position with respect to the absolute reference position and substantially the same width and in that said steps for comparing said quantities comprise a search for the quantity which has the maximum value.

19. A method of reconstructing successive scans of a bar code comprising a plurality of elements, said elements having a first and a second reflectivity and being represented by a width and a position with respect to a reference position, comprising:
  a) performing a first scan of the bar code and determining the position and the width of the elements in the first scan with respect to an absolute reference position;
  b) calculating the position which said elements in said first scan will take with respect to said absolute reference position in a subsequent scan;
  c) making a second scan of the bar code and determining the position and the width of the elements in said second scan with respect to said absolute reference position;
  d) carrying out a correspondence search step in order to find at least one reference element in said first scan and at least one reference element in said second scan which both have substantially the same position with respect to said absolute reference and substantially the same width; and
  e) combining the elements in said first scan with the elements in said second scan so as to generate a reconstructed scan; and wherein said step a) for carrying out a first scan is preceded by the steps of:
  f) carrying out a preliminary scan of said bar code by determining the position and the width of the elements in said preliminary scan with respect to said absolute reference position and associating the elements in said preliminary scan with a current area; and
  g) associating the elements in said current area with at least one of a plurality of loading areas.

20. A method according to claim 19, wherein said association step i) comprises the steps of:
  i1) selecting a loading area among said plurality of loading areas;
  i2) checking whether the selected area is already occupied;
  i3a) if said selected area has not already been occupied, investigating whether a subsequent loading area exists;
  i4a) if a subsequent loading area exists, returning to said step i2); and
  i4b) if no subsequent loading area exists, copying said elements in said current area into said unoccupied loading area, performing a first scan, associating the elements in said subsequent scan with said current area and returning to said step i1).

21. A method according to claim 20, wherein said step i4b) comprises, before said step of copying, the step of searching for synchronism characters between said elements in said current area; if the search for synchronism characters in said current area gives a positive result and synchronism characters are found, a condition of presence of the first synchronism is stored and said step of copying is carried out; if the search for synchronism characters in said current area gives a negative result and no synchronism characters are found, said step h of carrying out a preliminary scanning is repeated.

22. A method according to claim 21, wherein said step i2) of checking whether said selected area is already occupied comprises the step of checking whether said condition of presence of the first synchronism has been stored: if said condition of presence of the first synchronism is detected, the following step is carried out:
  i5) searching for a synchronism character among the elements in said current area;
  i6a) if said step i5) of searching gives a positive result and a synchronism character is found in said current area, the following steps are carried out: copying the elements in said current area into said loading area; storing a coupling condition; performing a said second scan, associating the elements in said subsequent scan with said current area and returning to said step i1);
  i6b) if said search step i5) gives a negative result and no synchronism character is found in said current area, cancelling said condition of presence of a first synchronism and returning to said step h).

23. A method according to claim 22, wherein said step 6a) of copying and storing is preceded by the steps of:
  i7) carrying out a coupling check to verify whether the elements in said current area and the elements in said loading area can be coupled;
  i8a) if said elements in said current area and the loading area can be coupled, carrying out the steps i6a) of copying and storing a coupling condition; and
  i8b) if said elements in said current area and the loading area cannot be coupled, updating a failed-attempts counter.

24. A method according to claim 23, wherein said coupling check step i7) comprises the steps of:
  i7-1) checking whether the number of elements in said current area has a predetermined relation to the number of elements in the loading area;
  i7-2a) if said checking step i7-1) gives a positive result, calculating the number of superposable elements between said loading area and said current area;
  i7-3) checking whether the number of superposable elements exceeds a predetermined threshold value;
  i7-4a) if said step i7-3) gives a positive result, carrying out the step i6a) for coupling and storing a coupling condition;
  i7-4b) if said step i7-3) gives a negative result, carrying out the step isb) for updating the failed attempts counter; and
  i7-2b) if said step i7-1) of checking gives a negative result, said step i8b) of updating the failed attempts counter is carried out.

25. A method according to claim 24, wherein the step i8b) of updating the failed attempts counter is followed by the steps of checking whether said failed attempts counter exceeds a predetermined threshold value and if the result is positive, storing an unoccupied loading area condition; then returning to said step h).

26. A method according to claim 22, wherein said step i2) also comprises the step i2-1) of checking the presence of said coupling condition and, if said coupling condition is detected, carrying out a correspondence search step i2-2) between the elements in said current area and the elements in said loading area.

27. A method according to claim 22, wherein said preliminary scan, said successive scan, said first scan and said second scan each comprise the steps of:
  a1) performing a complete scan from a beginning-of-scanning position to an end-of-scanning position;

a2) selecting a plurality of adjacent code elements;

a3) associating the plurality of adjacent elements with the current area;

a4) processing said elements in the current area;

a5) investigating whether other successive code elements exist in said complete scan;

a6a) if other adjacent code elements exist, selecting said other adjacent code elements and repeating said steps a3), a4) and a5); and a6b) if no other adjacent code elements exist, repeating said step a1).

28. A method according to claim 22, wherein the step i6a) also comprises the steps of:

o1) calculating the absolute position difference between the elements in said loading area and the corresponding elements in said current area;

o2) determining the position which the elements in said loading area will take during a subsequent scan as the sum of the absolute position of said elements in said loading area and said calculated difference.

29. A method according to claim 20, wherein if the result of the step i2) of checking indicates that said selected area is already occupied, the following steps are carried out:

i3b) superposability check between the elements in said loading area and the elements in said current area; and i9a) if said superposability check step i3b) gives a positive result, the elements in said current area are coupled with the elements in said storage area;

i9b) if said superposability check step i3b) gives a negative result, a return is made to said step i1) for selecting a loading area among said plurality of loading areas.

30. A method according to claim 29, wherein said correspondence search step d) is followed by the steps of:

j) coupling checking to check whether at least a predetermined number of elements in said current area or in said loading area have substantially the same position with respect to the absolute reference and substantially the same width;

k) if said coupling check step j) gives a negative result, updating a failed-attempts counter; and l) checking whether said failed-attempts counter exceeds a predetermined threshold value and, if the result is positive, storing an unoccupied loading area condition.

31. A method of reconstructing successive scans of a bar code comprising a plurality of elements, said elements having a first and a second reflectivity and being represented by a width and a position with respect to a reference position, comprising:

a) performing a first scan of the bar code and determining the position and the width of the elements in the first scan with respect to an absolute reference position;

b) calculating the position which said elements in said first will take with respect to said absolute reference position in a subsequent scan;

c) making a second scan of the bar code and determining the position and the width of the elements in said second scan with respect to said absolute reference position;

d) carrying out a correspondence search step in order to find at least one reference element in said first scan and at least one reference element in said second scan which both have substantially the same position with respect to said absolute reference and substantially the same width; and e) combining the elements in said first scan with the elements in said second scan so as to generate a reconstructed scan; and wherein said correspondence search step d) is preceded by a step m) of determining the direction of superposition, comprising the steps of:

m1) determining the number of elements in a third and a fourth scan which can be superposed starting from a predetermined element in said third and fourth scan and moving in a first direction;

m2) determining the number of elements in said third and fourth scan which can be superposed starting from a different predetermined element and moving in a second direction opposite the first direction;

m3) setting a first direction indicator if the number of elements determined in said step m1) is greater than the number of elements determined in said step m2); and m4) setting a second direction indicator if the numrber of elements determined in said step m2) is greater than the number of elements determined in said step m1).

32. A method according to claim 31, wherein said steps m1) and m2) of determining the number of superposable elements comprise a search for elements having substantially the same position with respect to said absolute reference position and substantially the same length, in said third and fourth scan starting from the first and last element respectively in said first and said second direction.

33. A method according to claim 31, wherein said correspondence search step d) is followed by the step of: n) determining the position which the elements in said third scan will take during a subsequent scan, said step n) of determining comprising the steps of:

n1) calculating the absolute position difference between the elements in the third scan and the corresponding elements in said fourth scan; and n2) summing the absolute position of said elements in the third scan and said calculated difference.

34. A method according to claim 33, wherein when said first indicator is set, the position difference between the first element in the third scan and the first element in the fourth scan is calculated in step n1) whereas when said second indicator is set, the position difference between the last element in the third scan and the last element in said fourth scan is determined in step n1).

35. A method of reconstructing successive scans of a bar code comprising a plurality of elements, said elements having a first and a second reflectivity and being represented by a width and a position with respect to a reference position, comprising:

a) performing a first scan of the bar code and determining the position and the width of the elements in the first scan with respect to an absolute reference position;

b) calculating the position which said elements in said first scan will take with respect to said absolute reference position in a subsequent scan;

c) making a second scan of the bar code and determining the position and the width of the elements in said second scan with respect to said absolute reference position;

d) carrying out a correspondence search step in order to find at least one reference element in said first scan and at least one reference element in said second scan which both have substantially the samre position with respect to said absolute reference and substantially the same width;

e) combining the elements in said first scan with the elements in said second scan so as to generate a reconstructed scan;

f) calculating the absolute position difference between the elements in said reconstructed scan and the corresponding elements in said second scan; and g) determining the position which the elements in said reconstructed scan will take during a subsequent scan as the sum of the absolute position of said elements in said reconstructed scan and said calculated difference.

36. A method of reconstructing successive scans of a bar code comprising a plurality of elements, said elements having a first and a second reflectivity and being represented by a width and a position with respect to a reference position, comprising:

a) performing a first scan of the bar code and determining the position and the width of the elements in the first scan with respect to an absolute reference position;

b) calculating the position which said elements in said first scan will take with respect to said absolute reference position in a subsequent scan;

c) making a second scan of the bar code and determining the position and the width of the elements in said second scan with respect to said absolute reference position;

d) carrying out a correspondence search step in order to find at least one reference element in said first scan and at least one reference element in said second scan which both have substantially the same position with respect to said absolute reference and substantially the same width; and e) combining the elements in said first scan with the elements in said second scan so as to generate a reconstructed scan; and wherein said step d) of correspondence search is preceded by a step p) of checking the superposability of said elements in said first scan and said second scan.

37. A method according to claim 36, wherein said step p) for checking superpoeability comprises the steps of:

1) checking whether the position of the last element in said second scan is not lower than the position of the first element in said first scan;

p2) checking whether the position of the first element in said second scan is not higher than the position of the last element in said first scan;

p3a) if the steps p1) and p2) of checking both give a positive result, the correspondence search step d) is carried out; and p3b) if at least one of said steps p1) and p2) of checking gives a negative result, carrying out a further step of scanning the bar code.

38. A method according to claim 36, wherein if the superposability check step p) has given a positive result, the following steps are carried out:

q) decoding the elements in said second scan; and r) transmitting the result of the decoding step q) to the exterior.

39. A method according to claim 1, wherein after said step e) of combining the elements in said first scan with the elements in said second scan, the following steps are carried out:

s) decoding the elements in said reconstructed scan and t) transmitting the result of said decoding step s) to the exterior.

* * * * *

UNITED STATES PATENT AND TRADEMARK OFFICE
CERTIFICATE OF CORRECTION

PATENT NO.    : 6,394,352 B1
DATED         : May 28, 2002
INVENTOR(S)   : Antonio De Renzis It is certified that error appears in the above-identified patent and that said Letters Patent is hereby corrected as shown below:

Column 1,
Line 45, "For example..." should not be a new paragraph.

Column 17,
Line 10, "it calculates..." should be a new paragraph.

Column 24,
Line 20, delete "step 6a)" and insert therefor -- step i6a) --.
Line 46, delete "step isb)" and insert therefor -- step i8b) --.

Column 25,
Line 55, after "first" insert -- scan --.

Column 28,
Line 5, "superpoeability" should read -- superposability --.
Line 6, delete "1)" and insert therefor -- p1) --.

Signed and Sealed this

Fourth Day of February, 2003

JAMES E. ROGAN
*Director of the United States Patent and Trademark Office*